(12) United States Patent
Maucec et al.

(10) Patent No.: US 11,409,015 B2
(45) Date of Patent: Aug. 9, 2022

(54) METHODS AND SYSTEMS FOR GENERATING GRAPH NEURAL NETWORKS FOR RESERVOIR GRID MODELS

(71) Applicant: SAUDI ARABIAN OIL COMPANY, Dhahran (SA)

(72) Inventors: Marko Maucec, Englewood, CO (US); Ridwan S. Jalali, Dhahran (SA); Mubarak N. Dossary, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 60 days.

(21) Appl. No.: 16/900,050

(22) Filed: Jun. 12, 2020

(65) Prior Publication Data
US 2021/0389491 A1 Dec. 16, 2021

(51) Int. Cl.
| | |
|---|---|
| *G01V 1/46* | (2006.01) |
| *G06N 20/00* | (2019.01) |
| *G01V 1/50* | (2006.01) |
| *G06N 3/04* | (2006.01) |

(52) U.S. Cl.
CPC .................. *G01V 1/46* (2013.01); *G01V 1/50* (2013.01); *G06N 3/0454* (2013.01); *G06N 20/00* (2019.01)

(58) Field of Classification Search
CPC . G01V 1/46; G01V 1/50; G06N 20/00; G06N 3/0454
See application file for complete search history.

(56) References Cited

U.S. PATENT DOCUMENTS

| | | |
|---|---|---|
| 8,121,971 B2 | 2/2012 | Edwards et al. |
| 8,195,401 B2 | 6/2012 | Ella et al. |
| 2003/0204311 A1 | 10/2003 | Bush |
| 2004/0024739 A1 | 2/2004 | Copperman et al. |

(Continued)

FOREIGN PATENT DOCUMENTS

| | | |
|---|---|---|
| CN | 108830421 A | 11/2018 |
| WO | 2018029454 A1 | 2/2018 |
| WO | 2019118658 A1 | 6/2019 |

OTHER PUBLICATIONS

Negash et al. „Application of artificial neural networks for calibration of a reservoir model, (Year: 2018).*

(Continued)

*Primary Examiner* — Mohammad K Islam
(74) *Attorney, Agent, or Firm* — Osha Bergman Watanabe & Burton LLP

(57) ABSTRACT

A method may include obtaining dynamic response data regarding a geological region of interest. The dynamic response data may include various transmissibility values. The method may further include determining a reservoir graph network based on the dynamic response data and a reservoir grid model. The reservoir graph network may include various grid cells, various wells, and various graph edges. The method may further include generating a graph neural network based on the reservoir graph network. The method may further include updating the graph neural network using a machine-learning algorithm to produce an updated graph neural network for the geological region of interest. The method may further include simulating a well within the geological region of interest using the updated graph neural network.

17 Claims, 16 Drawing Sheets

(56) References Cited

U.S. PATENT DOCUMENTS

| | | | |
|---|---|---|---|
| 2007/0179768 A1* | 8/2007 | Cullick | E21B 43/00 703/10 |
| 2010/0211536 A1 | 8/2010 | Al-Fattah | |
| 2011/0282818 A1 | 11/2011 | Chen et al. | |
| 2013/0118736 A1 | 5/2013 | Usadi et al. | |
| 2013/0124171 A1 | 5/2013 | Schuette et al. | |
| 2017/0293842 A1 | 10/2017 | Buchanan et al. | |
| 2019/0064389 A1 | 2/2019 | Denli et al. | |
| 2019/0107645 A1 | 4/2019 | Nolan et al. | |
| 2020/0026270 A1 | 1/2020 | Celia et al. | |
| 2020/0047336 A1 | 2/2020 | Savini et al. | |

OTHER PUBLICATIONS

Habib et al., Improving history match using artificial neural networks, (Year: 2017).*

Vaferi et al., Hydrocarbon reservoir model detection from pressure transient datausing coupled artificial neural network—Wavelet transform approach, (Year: 2016).*

Chu et al., An Automatic Classification Method of Well Testing Plot Based on Convolutional Neural Network (CNN), (Year: 2019).*

Madasu et al., Compressing Time-Dependent Reservoir Simulations Using Graph-Convolutional Neural Network G-CNN (Year: 2019).*

Battaglia, Peter W. et al., "Interaction Networks for Learning about Objects, Relations and Physics", Columbia University, arXiv:1612.00222v1 [cs.AI], Dec. 1, 2016 (12 pages).

Hallac, David et al., "Network Interference via the Time-Varying Graphical Lasso", Cornell University, arXiv:1703.01958v2 [cs.LG], Jun. 10, 2017 (9 pages).

Francois-Lavet, Vincent et al., "An Introduction to Deep Reinforcement Learning", Foundations and Trends in Machine Learning, Now, The Essence of Knowledge, vol. 11, No. 3-4, Dec. 3, 2018, DOI: 10.1561/2200000071 (140 pages).

Golmohammadi, Azarang, "Beyond Limits—Hybrid Modelling: Challenges and Opportunities in the Subsurface", SPE Meeting, Nov. 2019 (14 pages).

Burkov, Andriy, "Chapter 3: Fundamental Algorithms", The Hundred-Page Machine Learning Book, Jan. 2019, pp. 21-23 (4 pages).

Fraces, Cedric, "Physics Informed Deep Learning and its Application to Flow and Transport in Porous Media", SPE Workshop, Society of Petroleum Engineers, Nov. 2019 (16 pages).

Chang, Haibin et al., "Deep Learning of Subsurface Flow via Theory-guided Neural Network", SPE Workshop, Society of Petroleum Engineers, Nov. 2019 (28 pages).

Leskovec, Jure et al., "Next-generation Algorithms for Networks", BigNet Workshop, 2017 (69 pages).

Maucec, Marko et al., "Streamline-Based History Matching and Uncertainty: Markov-chain Monte Cado Study of an Offshore Turbidite Oil Field", SPE-109943, Society of Petroleum Engineers, Nov. 2007, pp. 1-16 (16 pages).

Madasu, Srinath, et al., "Compressing Time-Dependent Reservoir Simulations Using Graph-Convolutional Neural Network G-CNN", SPE-197444-MS, Society of Petroleum Engineers, Nov. 2019, pp. 1-14 (14 pages).

Wang, Haochen, et al., "An Interpretable Interflow Simulated Graph Neural Network for Reservoir Connectivity Analysis", Aug. 2021 SPE Journal, Society of Petroleum Engineers, pp. 1636-1651 (16 pages).

International Search Report issued in corresponding International Application No. PCT/US2021/037063, dated Oct. 1, 2021 (4 pages).

Written Opinion issued in corresponding International Application No. PCT/US2021/037063, dated Oct. 1, 2021 (9 pages).

* cited by examiner

METHODS AND SYSTEMS FOR GENERATING GRAPH NEURAL NETWORKS FOR RESERVOIR GRID MODELS

BACKGROUND

Well performance models play an important role in managing hydrocarbon production at various well sites. In particular, a well performance model may calculate future oil, water and gas production rates from a well in an oil and gas reservoir. For example, production at one well in a reservoir may have an effect on future production on a different well connected to the same reservoir. Accordingly, reservoir simulations often model multiple wells on a reservoir rather than a single well. However, increasing the number of wells in a reservoir simulation may also increase the runtime necessary to perform the reservoir simulation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, dynamic response data regarding a geological region of interest. The dynamic response data include various transmissibility values. The method further includes determining, by the computer processor, a reservoir graph network based on the dynamic response data and a reservoir grid model. The reservoir graph network includes various grid cells, various wells, and various graph edges. The method further includes generating, by the computer processor, a graph neural network based on the reservoir graph network. The method further includes updating, by the computer processor, the graph neural network using a machine-learning algorithm to produce an updated graph neural network for the geological region of interest. The method further includes simulating, by the computer processor, a well within the geological region of interest using the updated graph neural network.

In general, in one aspect, embodiments relate to a system that includes a logging system coupled to various logging tools. The system further includes a simulator device that includes a computer processor and is coupled to the logging system. The simulator device obtains dynamic response data regarding a geological region of interest. The dynamic response data include various transmissibility values. The simulator device determines a reservoir graph network based on the dynamic response data and a reservoir grid model. The reservoir graph network includes various grid cells, various wells, and various graph edges. The simulator device generates a graph neural network based on the reservoir graph network. The simulator device updates the graph neural network using a machine-learning algorithm to produce an updated graph neural network for the geological region of interest. The simulator device simulates a well within the geological region of interest using the updated graph neural network.

In general, in one aspect, embodiments relate to non-transitory computer readable medium storing instructions executable by a computer processor. The instructions obtain dynamic response data regarding a geological region of interest. The dynamic response data include various transmissibility values. The instructions further determine a reservoir graph network based on the dynamic response data and a reservoir grid model. The reservoir graph network includes various grid cells, various wells, and various graph edges. The instructions further generate a graph neural network based on the reservoir graph network. The instructions further update the graph neural network using a machine-learning algorithm to produce an updated graph neural network for the geological region of interest. The instructions further simulate a well within the geological region of interest using the updated graph neural network.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using a machine-learning algorithm to generate a graph neural network from a reservoir graph network. In particular, grid cells and coarsened grid blocks may be associated with nodes in a graph network. Thus, rather than simply using a grid model to perform simulations, a reservoir region in the grid model may also be represented as a graph network. For example, dynamic responses from previous simulations may be used to determine graph edges for a corresponding reservoir graph network. Once a reservoir region is converted into a reservoir graph network, the reservoir graph network may be transformed into a machine-learning model, such as a graph convolutional neural network (GCNN) or simply a graph neural network. Accordingly, the machine-learning model may be trained in order to predict data that may otherwise require full-field physics simulations.

Moreover, in simulations of massive hydrocarbon reservoirs, simulation grid sizes routinely exceed hundreds of millions grid cells with numerous possible scenarios and realizations. Given this situation, a machine-learning model may provide a faster solution to simulating reservoirs. For example, a reliable solution to a reservoir scenario may be obtained in real-time using artificial intelligence. However, many predictive data models may be fast but inaccurate in contrast to full-physics models that may be accurate but slow. Thus, some embodiments include systems that model reservoirs from a fundamentally different perspective than a traditional grid model. Thus, a graph neural network based on a geological region may provide a dynamic, interactive network of objects and relations for simulating and predicting data.

Figure 1:
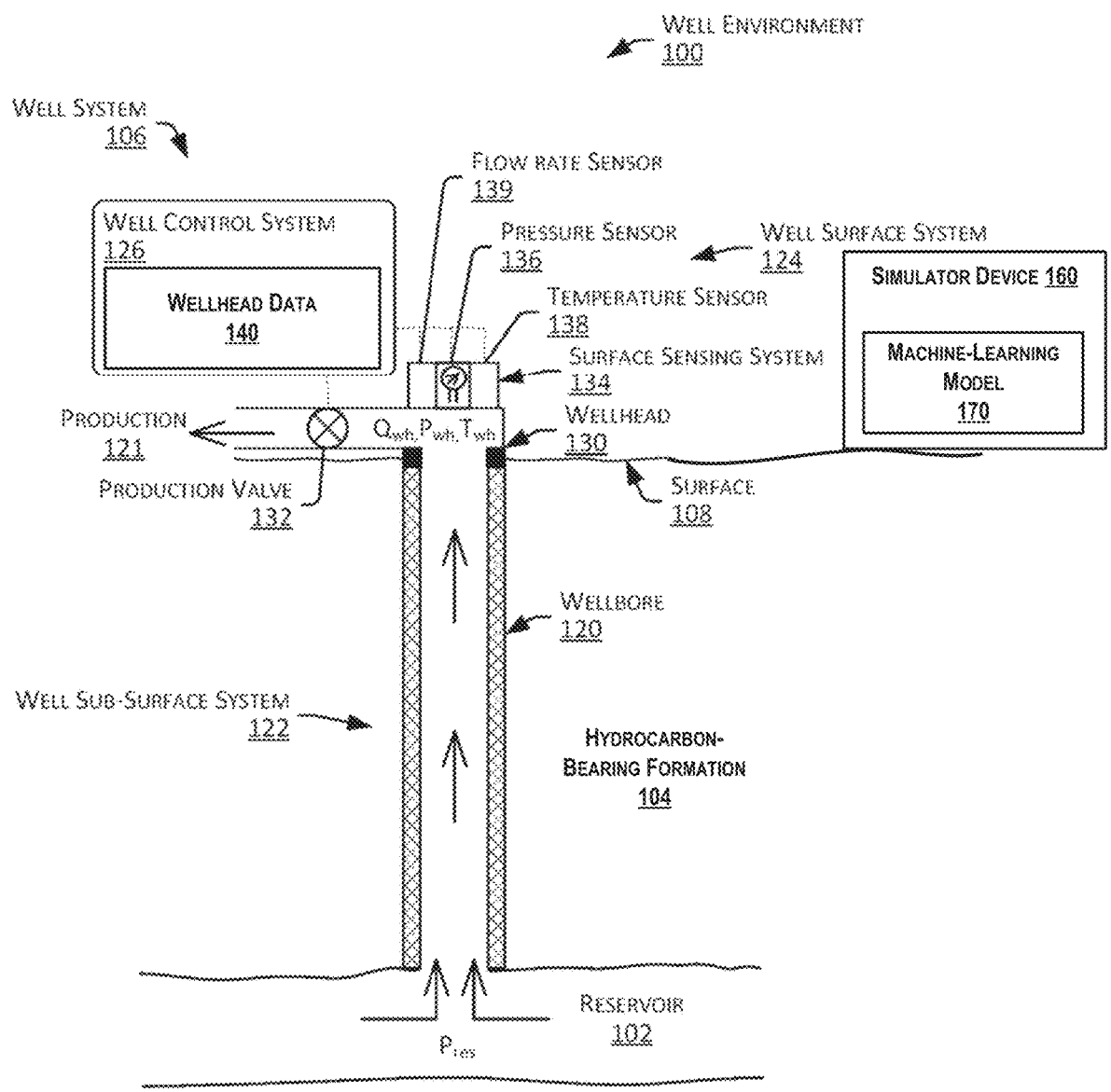
FIGS. 1, 2A, 2B, 3, 4, and 5 show systems in accordance with one or more embodiments.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computing system (1400) described below in FIG. 14 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) ($Q_{wh}$) passing through the wellhead (130).

In some embodiments, the well system (106) includes a simulator device (160). For example, the simulator device (160) may include hardware and/or software with functionality for generating one or more reservoir models regarding the hydrocarbon-bearing formation (104) and/or performing one or more reservoir simulations that perform a full-physics model of a reservoir region of interest. For example, the simulator device (160) may store well logs and data regarding core samples for performing simulations. A simulator device may further analyze the well log data, the core sample data, seismic data, and/or other types of data to generate and/or update the one or more reservoir models. While the simulator device (160) is shown at a well site, embodiments are contemplated where simulator device are located away from well sites. In some embodiments, the simulator device (160) may include a computer system that is similar to the computing system (1400) described below with regard to FIG. 14 and the accompanying description.

In some embodiments, the simulator device (160) generates and/or updates one or more machine-learning models (e.g., machine-learning model (170)). For example, different types of models may be trained, such as support vector machines, decision trees, inductive learning models, deductive learning models, supervised learning models, etc. In some embodiments, the one or more machine-learning models include one or more neural networks. For example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer. In some embodiments, a neural network is a graph neural network. For more information on graph neural networks, see FIG. 5 and the accompanying description below.

Figure 2A:
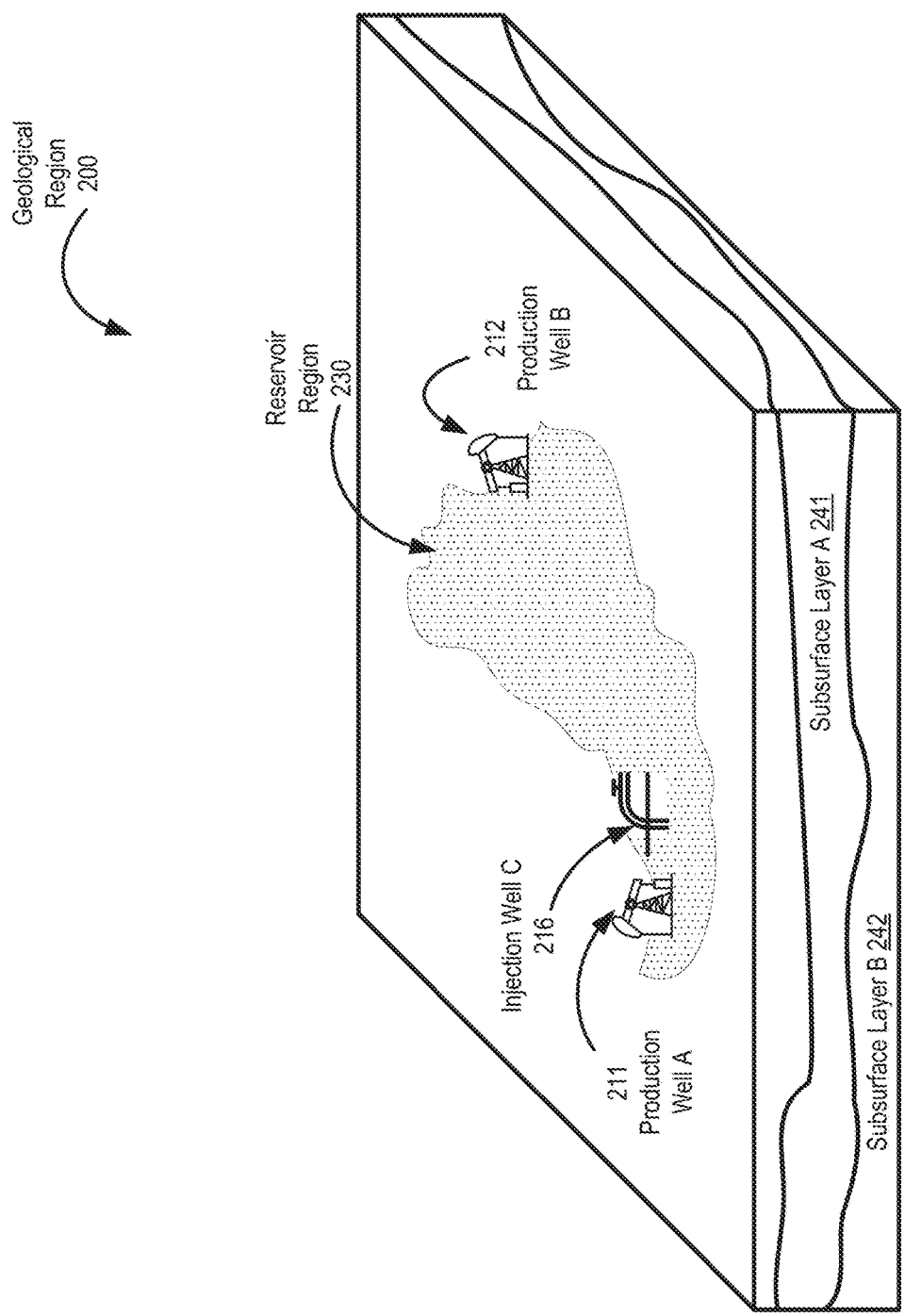

Turning to FIG. 2A, FIG. 2A shows a schematic diagram in accordance with one or more embodiments. As illustrated in FIG. 2A, FIG. 2A shows a geological region (200) that may include one or more reservoir regions (e.g., reservoir region (230)) with various production wells (e.g., production well A (211), production well (212)). For example, a production well may be similar to the well system (106) described above in FIG. 1 and the accompanying description. Likewise, a reservoir region may also include one or more injection wells (e.g., injection well C (216)) that include functionality for enhancing production by one or more neighboring production wells. As shown in FIG. 2A, wells may be disposed in the reservoir region (230) above various subsurface layers (e.g., subsurface layer A (241), subsurface layer B (242)), which may include hydrocarbon deposits. In particular, production data and/or injection data may exist for a particular well, where production data may include data that describes production or production operations at a well, such as wellhead data (140) described in FIG. 1 and the accompanying description.

Figure 2B:
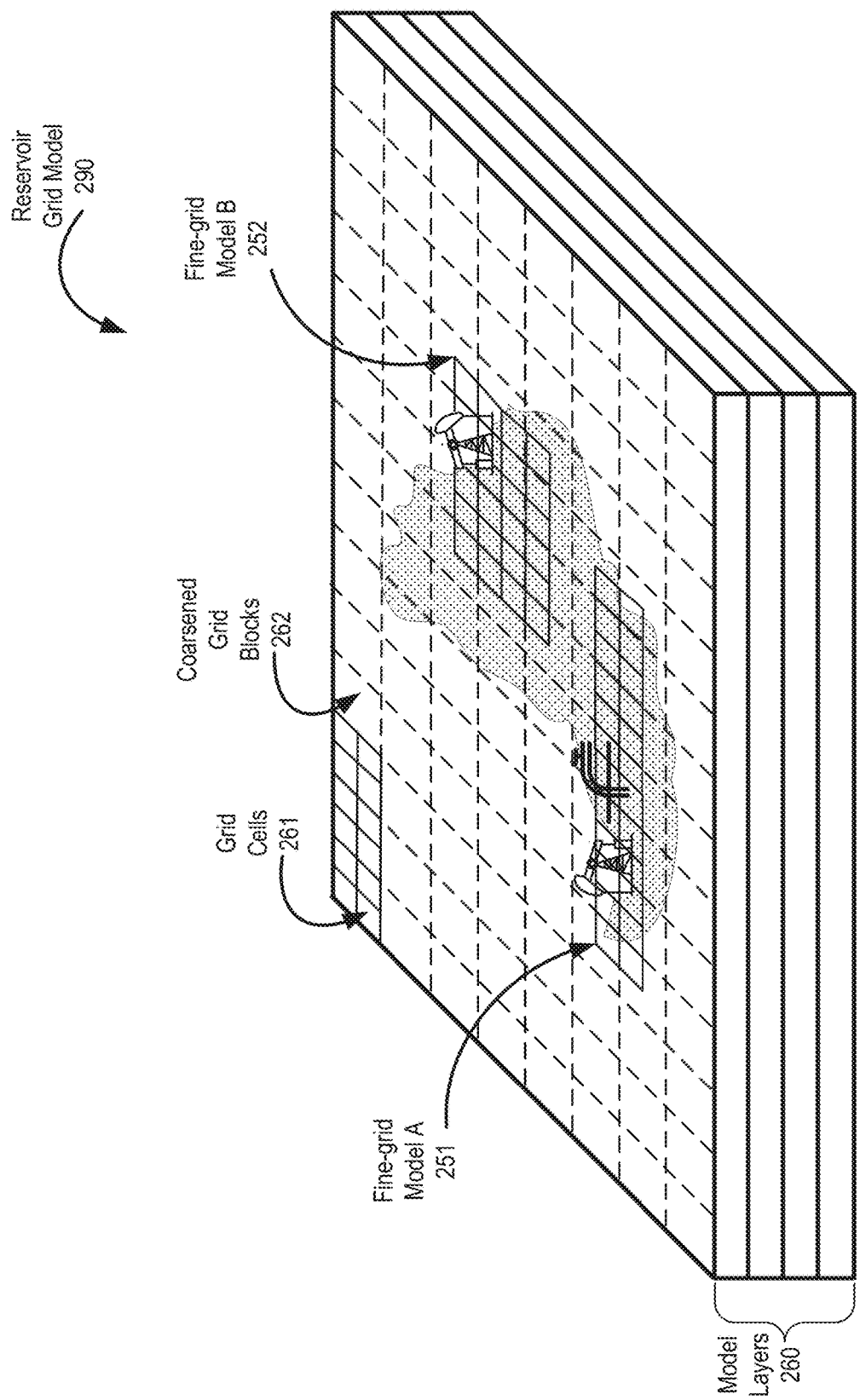

Turning to FIG. 2B, FIG. 2B shows a schematic diagram in accordance with one or more embodiments. As illustrated in FIG. 2B, FIG. 2B shows a reservoir grid model (290) that corresponds to the geological region (200) from FIG. 2A. More specifically, the reservoir grid model (290) includes grid cells (261) that may refer to an original cell of a reservoir grid model as well as coarsened grid blocks (262) that may refer to an amalgamation of original cells of the reservoir grid model. For example, a grid cell may be the case of a 1×1 block, where coarsened grid blocks may be of sizes 2×2, 4×4, 8×8, etc. Both the grid cells (261) and the coarsened grid blocks (262) may correspond to columns for multiple model layers (260) within the reservoir grid model (290).

Prior to performing a reservoir simulation, local grid refinement and coarsening (LGR) may be used to increase or decrease grid resolution in a certain area of reservoir grid model. By discretizing reservoir properties, e.g., permeability, porosity or saturations, within grid cells and coarsened grid blocks, reservoir properties within a respective cell or respective block may be approximated by introducing a discretization error. Thus, finer grids may reduce discretization errors through a higher computational cost. As shown in FIG. 2B, for example, the reservoir grid model (290) may include various fine-grid models (i.e., fine-grid model A (251), fine-grid model B (252)), that are surrounded by coarsened block regions. Likewise, the original reservoir grid model without any coarsening may also be a fine-grid model.

Figure 3:
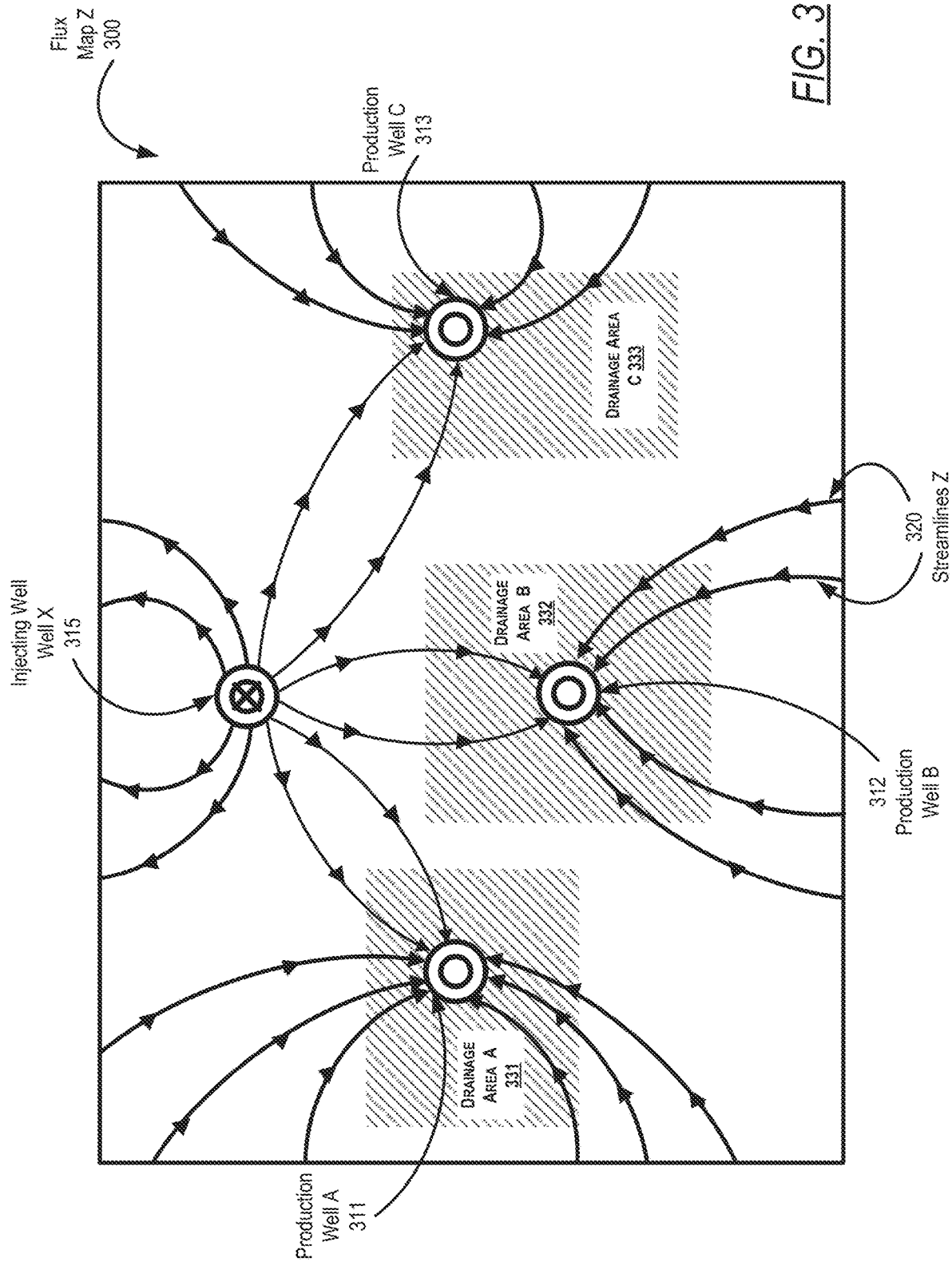

Turning to FIG. 3, FIG. 3 shows a schematic diagram in accordance with one or more embodiments. As shown in FIG. 3, a flux map (e.g., flux map Z (300)) may describe various flow properties between various productions wells (e.g., production well A (311), production well B (312), production well C (313)) and an injection well (injection well X (315)) within a reservoir region. For example, the flux map Z (300) includes various streamlines (e.g., streamlines Z (320)) that may be generated during one or more reservoir simulations of the reservoir region. In particular, streamlines may be field lines instantaneously tangent to a fluid velocity field that provide a representation of reservoir connectivity. As such, streamlines may provide an alternative to cell-based grid modeling techniques in reservoir simulations, where a streamline output from a simulator device may include a snapshot of an instantaneous flow field in a geological region. Streamlines may be beneficial in understanding the boundaries of one or more well drainage volumes (e.g., a drainage volume may correspond to drainage area A (331), drainage area B (332), and/or drainage area C (333)) in a reservoir region. Likewise, individual streamlines may describe flow properties of a production well (e.g., production well A (311), production well B (312), production well C (313)) or an injection well (e.g., injection well X (315)).

In some embodiments, a simulator device may transform a reservoir grid model into a number of flow paths of nominally constant flux similar to the flux map Z (300) shown in FIG. 3. While flow paths may be three dimensional, the flow paths may be solved independently as essentially one dimensional problems. Since a streamline may operate independently of other streamlines in the reservoir region, streamlines may be treated as a quasi-orthogonal basis set that describes a total flow of injected fluids into a flow path. Thus, streamline simulations may provide reservoir engineering information, such as the identification of waterflood patterns, well pair connections between injection wells and production wells, and areas of flood inefficiency. By calculating interwell multiphase fluxes using streamlines, for example, streamline simulations may identify how much oil production comes from the pressure support from a certain injection well. With this streamline information, injection rates and/or production rates may be adjusted in order to reduce water cycling, increase oil recovery, and/or improve flood management. Likewise, using a reservoir grid model and pre-injection data, a forward solution of an impact of fluid injected along a streamline may be determined independently. The results may be mapped back onto the original grid model to update fluid compositions as a function of time as well as indicate appropriate porosity and permeability changes in the underlying reservoir grid model.

In some embodiments, a simulator device determines flow property data from streamlines. For example, flow property data may include time of flight (TOF) information regarding one or more streamlines. More specifically, TOF information may describe a particle travel time along a streamline within a reservoir region. A shorter travel time of the particle may correspond to a stronger reservoir connection, while a longer travel time may correspond to a weaker reservoir connection. Thus, a simulator device may use streamlines in a particular simulation period to determine one or more dynamic flow property values. Likewise, flow property data may be discretized flow information outputted from streamline tracing software, such as a flux value file obtained after performing a streamline simulation.

Figure 4:
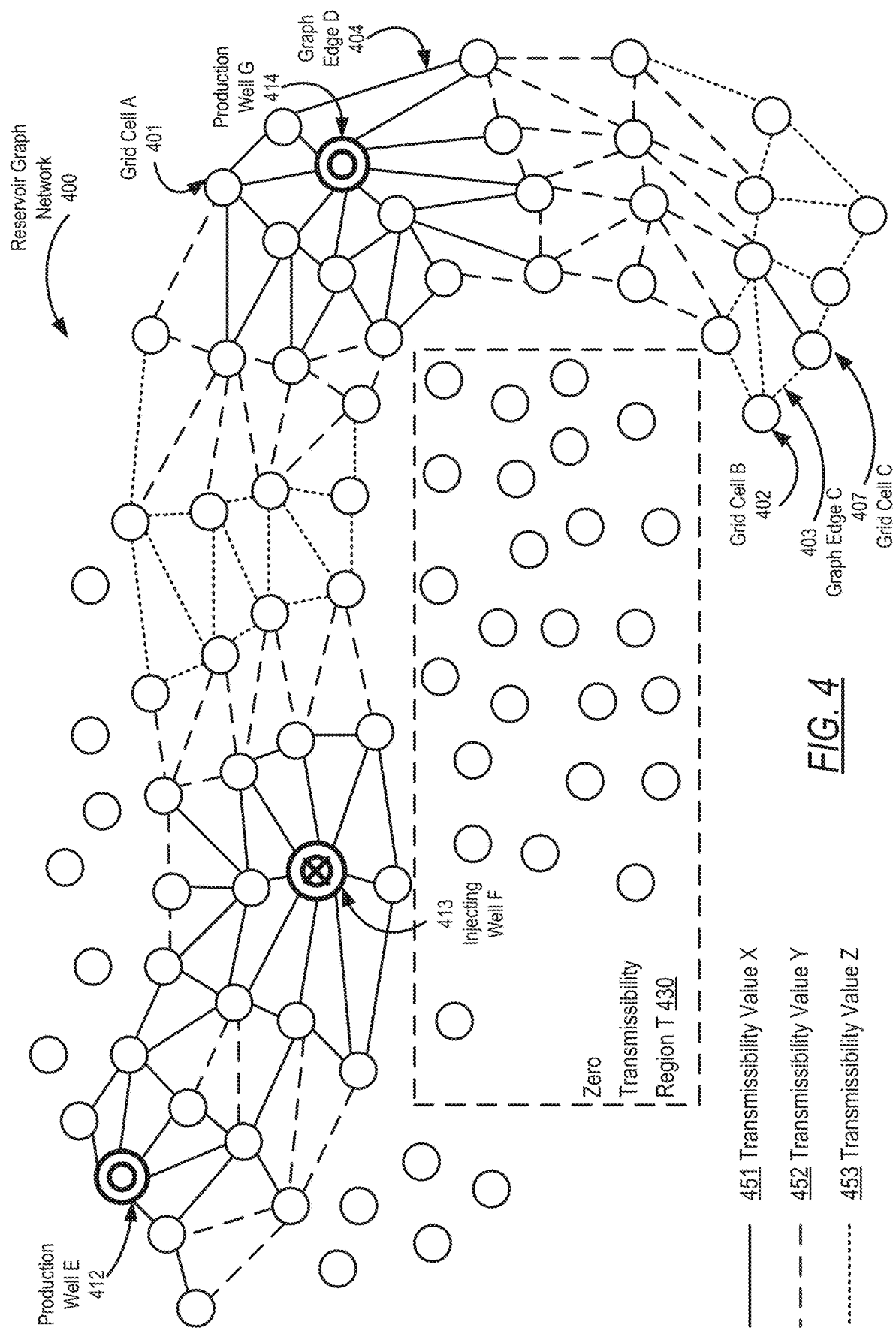

Turning to FIG. 4, FIG. 4 shows a schematic diagram in accordance with one or more embodiments. As shown in FIG. 4, a reservoir grid model may be represented as a reservoir graph network (e.g., reservoir graph network (400)) that includes various graph nodes (e.g., grid cell A (401), grid cell B (402), production well E (412), injecting well F (413), and production well G (414)) that are connected using various graph edges (e.g., graph edge C (403), graph edge D (404)). In particular, individual graph nodes in a reservoir graph network may correspond to respective grid cells in a reservoir grid model. Likewise, graph edges in a reservoir graph network may represent reservoir connectivity values between graph nodes. As such, one type of reservoir connectivity for generating graph edges may be based on flow property data determined from streamlines, e.g., as described above in FIG. 3 and the accompanying description. More specifically, graph edges between nodes may correspond to transmissibility values within a reservoir region, where a transmissibility value may be a measure of the ability of a reservoir region to produce a particular fluid based on rock properties and fluid properties within the reservoir region. For example, graph edge C (403) may correspond to a transmissibility value measured between grid cell B (402) and grid cell C (407).

In the reservoir graph network (400), for example, graph edges correspond to various transmissibility values (i.e., transmissibility value X (451), transmissibility value Y (452), transmissibility value Z (453)), where the transmissibility values (451, 452, 453) may correspond to individual values or ranges of values. Likewise, the absence of a line between two nodes may correspond to no transmissibility between the two nodes, e.g., the nodes disposed in the zero transmissibility region T (430).

Figure 5:
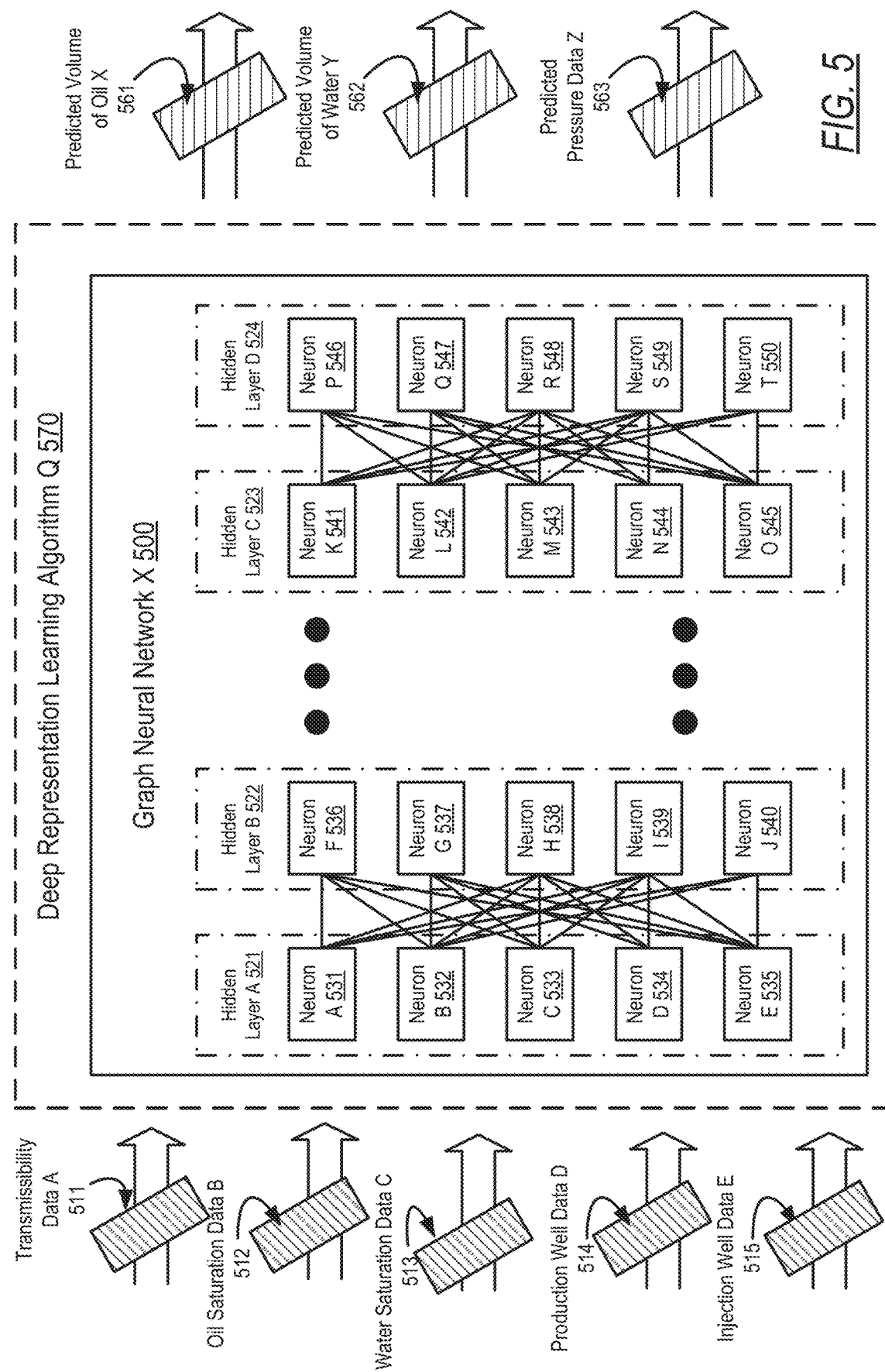

Turning to FIG. 5, FIG. 5 shows a schematic diagram in accordance with one or more embodiments. As shown in FIG. 5, a graph neural network (e.g., graph neural network X (500)) may be generated from a reservoir graph network. In particular, a graph neural network may include various hidden layers (e.g., hidden layer A (521), hidden layer B (522), hidden layer C (523), hidden layer D (524)) that includes various neurons (e.g., neuron A (531), neuron B (532), neuron C (533), neuron D (534), neuron E (535), neuron F (536), neuron G (537), neuron H (538), neuron I (539), neuron J (540), neuron K (541), neuron L (542), neuron M (543), neuron N (544), neuron O (545), neuron P (546), neuron Q (547), neuron R (548), neuron S (549), neuron T (550)). In particular, a graph neural network may predict data (e.g., predicted volume of oil X (561), predicted volume of water Y (562), predicted pressure data Z (563)) based on various inputs (e.g., transmissibility data A (511), oil saturation data B (512), water saturation data C (513), production well data (514), injection well data E (515)). While some types of inputs are shown in FIG. 5, other embodiments are contemplated that may include pressure data, pore volume data, connate water saturation data, oil-water relative permeability data, grid cell indices, etc. as inputs to the graph neural network.

Keeping with FIG. 5, neuron within a graph neural network may correspond to various objects with predetermined object features. Likewise, neurons in different hidden layers may be connected by various relations with predetermined relation features. Thus, a graph neural network may also be illustrated as a series of object nodes connected by graph edges corresponding to predetermined relations. For more information on graph neural networks based on objects and relations, see FIGS. 11, 12A, and 12B below and the accompanying description. Furthermore, a graph neural network may be trained using a machine-learning algorithm (e.g., deep representation learning algorithm Q (570)). For more information on machine-learning algorithms and machine-learning models, see machine-learning model (170) in FIG. 1 above and the accompanying description. In some embodiments, a deep representation learning algorithm is used to train a graph neural network. For more information on deep representation learning algorithms, see FIG. 13 and the accompanying description below. For more information on generating and/or training a graph neural network, see FIG. 10 and the accompanying description below.

Figure 6:
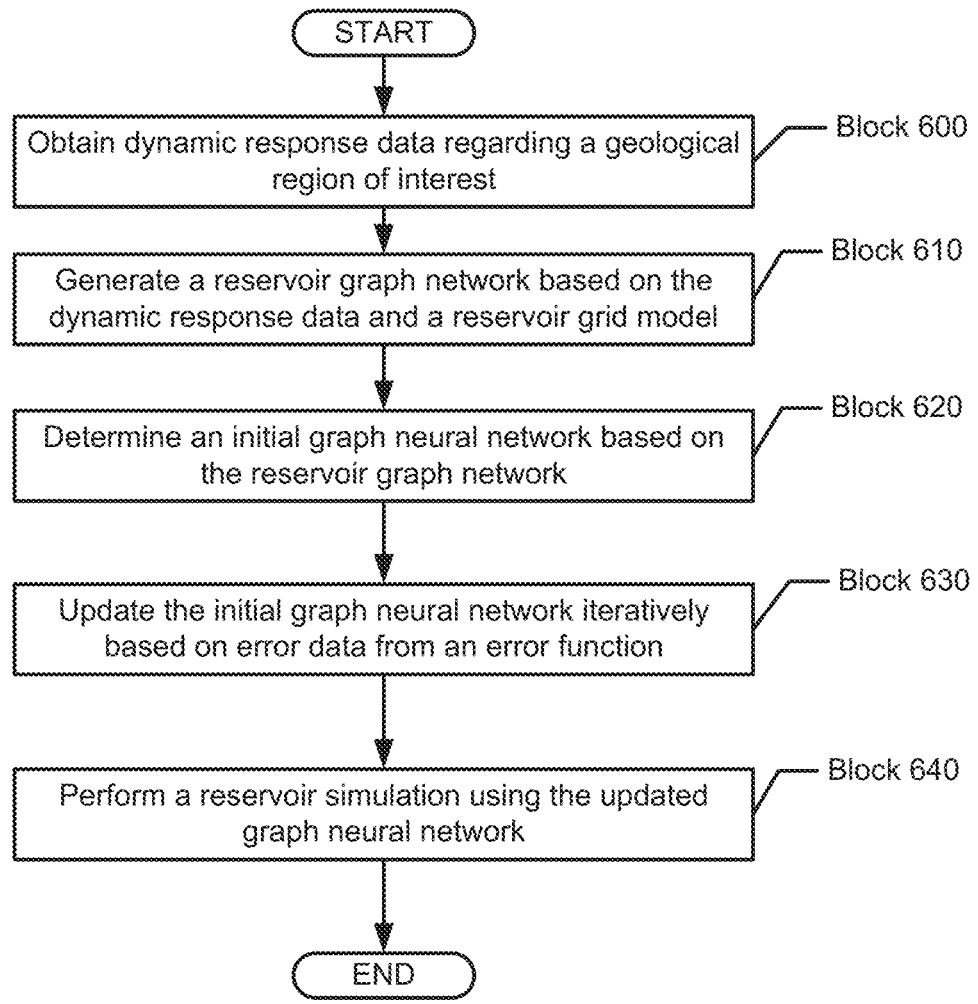
FIGS. 6 and 7 show flowcharts in accordance with one or more embodiments.

Turning to FIG. 6, FIG. 6 shows a flowchart in accordance with one or more embodiments. Specifically, FIG. 6 describes a general method for simulating a reservoir region of interest using a graph neural network. One or more blocks in FIG. 6 may be performed by one or more components (e.g., simulator device (160)) as described in FIGS. 1, 2B, 4, and 5. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, dynamic response data is obtained regarding a geological region of interest in accordance with one or more embodiments. Dynamic response data may include transmissibility values or similar data based on one or more full-physics reservoir simulations performed for the geological region of interest. For example, a simulator device may use static reservoir property data to simulate streamlines in one or more reservoir property realizations to produce dynamic response data. In particular, dynamic response data may describe reservoir connectivity within the geological region of interest, where reservoir connectivity impacts fluid and pressure dynamic, fluid flow patterns, hydrocarbon recovery and produced hydrocarbon reserves, as well as well communication and productivity. The simulator device may use grid model data to determine dynamic response data as well as updated property data for multiple reservoir property realizations. For more information on obtaining dynamic response data, see FIG. 7 and the accompanying description below.

Furthermore, the geological region of interest may correspond to a portion of a geological region desired or selected for running simulations and further analysis. For example, the geological region of interest may be similar to geological region (200) or reservoir region (230) described above in FIG. 2A and the accompanying description.

In Block 610, a reservoir graph network is generated based on reservoir graph network based on dynamic response data and a reservoir grid model in accordance with one or more embodiments. More specifically, a reservoir grid model may be similar to the reservoir grid model (290) shown above in FIG. 2A, while the reservoir graph network may be similar to the reservoir graph network (400) shown above in FIG. 4. As such, a simulator device may define and integrate spatial, 3D grid-distributed parameters and attributes of reservoir simulation models into a reservoir graph network. Subsequently, the simulator device may provide a reservoir graph network as an input into a machine-learning training process that produces an initial graph neural network. As such, the graph neural network may accelerate physics-based simulations by providing a representation of learning and physical reasoning associated with large-scale networks of petroleum systems.

In Block 620, an initial graph neural network is determined based on a reservoir graph network in accordance with one or more embodiments. In some embodiments, for example, a reservoir graph network is prepared for a machine-learning algorithm, such as through a one-hot encoding process. Where the reservoir graph network includes reservoir property values based on dynamic response data and grid cell data, the reservoir graph network may be transformed into a format useable for machine learning. For example, a simulator device may map graph nodes and graph edges to objects and relations within a graph neural network to produce a neural network parameterization. This neural network parameterization may be trained and/or updated using multiple machine-learning epochs. For more information on generating a neural network parameterization and/or generating a graph neural network, see FIG. 10 and the accompanying description below.

In Block 630, an initial graph neural network is updated iteratively based on error data from an error function in accordance with one or more embodiments. At different times during a training process, a graph neural network may be analyzed with an error function that compares predicted data from the graph neural network with acquired data obtained independently of the graph neural network. This comparison may result in error data that is used to update the graph neural network. In some embodiments, for example, the error function is a multi-objective misfit function that leverages a machine-learning algorithm to update the graph neural network. For example, the machine-learning algorithm may be a deep reinforcement learning (DRL) algorithm, where the graph neural network is retrained at different machine-learning epochs based on the time-dependent updates produced by the misfit function. In some embodiments, the error function may be a least squares method that solves various linear equations by summing over wells included in the reservoir grid model and timesteps used in reservoir simulations. For more information on training with a DRL algorithm, see FIG. 14 and the accompanying description below.

Keeping with Block 630, a simulator device may use a machine-learning algorithm to minimize error data associated with a machine-learning model. For example, an iterative training process may be performed until the error data is minimized or converges to a predetermined criterion. For example, the predetermined criterion may correspond to a predetermined accuracy level of the graph neural network, e.g., until objects and relations within the graph neural network achieve a global minimum. Likewise, the predetermined criterion may also correspond to a specified number of machine-learning epochs for training the graph neural network. Thus, a trained graph neural network may achieve simulations beyond proxy modeling based on learning and reasoning from graph network dynamics.

In Block 640, a reservoir simulation is performed using an updated graph neural network in accordance with one or more embodiments. Rather than performing full-physics simulations based on fluid and rock properties, the graph neural network may approximate simulated data of a full-physics simulation at different time steps based on specified input data. In some embodiments, multiple graph neural networks are used in place of simulations based on grid data. Moreover, reservoir simulations may include various types of reservoir studies, e.g. history matching and field development and optimization. For example, different types of reservoir simulations may use different input parameters that may result in changes to the reservoir grid model data and dynamic response data, such as by changing flow patterns and streamlines.

Figure 7:
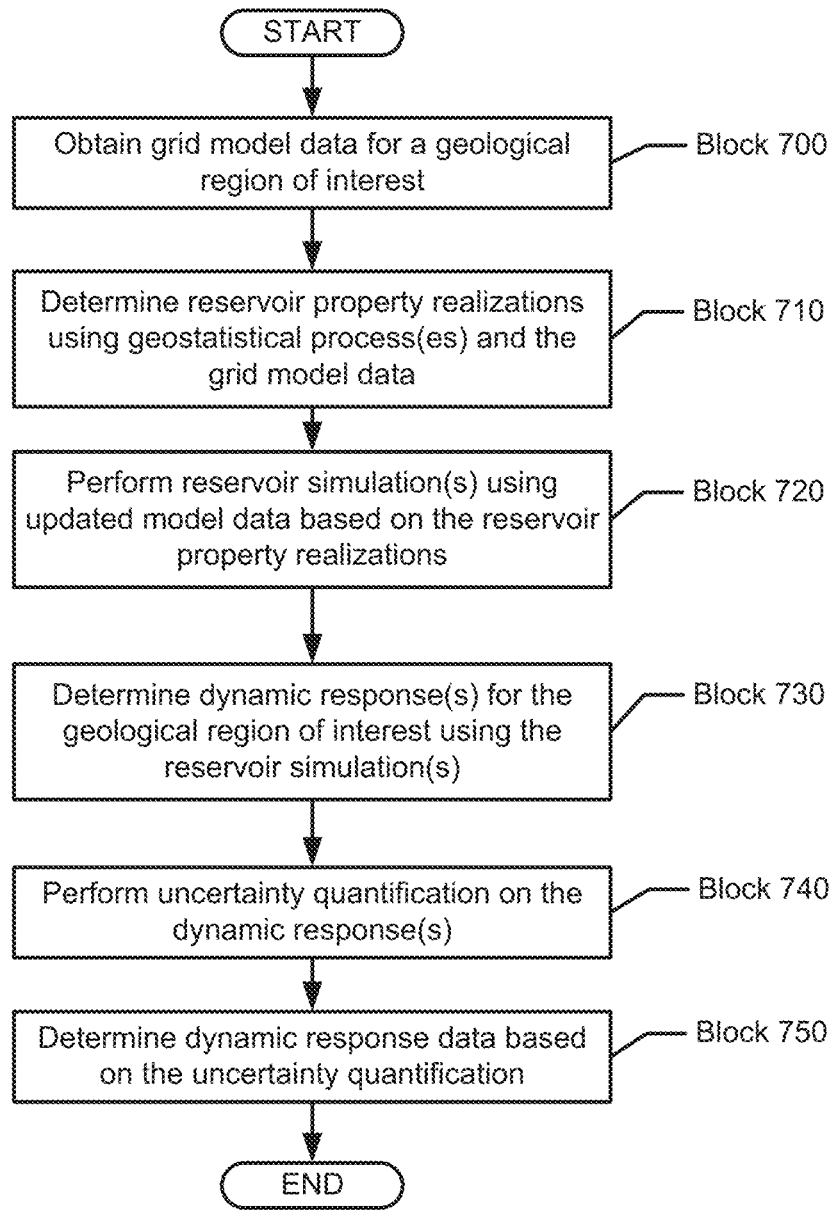

Turning to FIG. 7, FIG. 7 shows a flowchart in accordance with one or more embodiments. Specifically, FIG. 7 describes a specific method for generating dynamic response data. One or more blocks in FIG. 7 may be performed by one or more components (e.g., simulator device (160)) as described in FIGS. 1, 2B, 4, and 5. While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 700, grid model data is obtained for a geological region of interest in accordance with one or more embodiments. For example, a simulator device may access grid model data within a reservoir grid model, where the grid model data includes various reservoir property values, such as oil saturation, water saturation, porosity, permeability, etc. In some embodiments, the grid model data is obtained from a reservoir grid model similar to reservoir grid model (290) described in FIG. 2B and the accompanying description.

In Block 710, various reservoir property realizations are determined using one or more geostatistical processes and grid model data in accordance with one or more embodiments. In particular, a reservoir property for a grid cell within a simulation may not correspond to a single property value, but may include a range of possible values according to various geostatistical probabilities and reservoir property realizations. As such, a reservoir property realization may describe a range of static property values based on one or more geostatistical processes. In some embodiments, for example, geostatistical processes include kriging methods, cokriging methods, geographically weighted regression techniques, geostatistical simulation, etc. For a reservoir simulation, multiple reservoir property realizations may be analyzed to provide updated model data that describe various property combinations within reservoir simulation scenarios.

In Block 720, one or more reservoir simulations are performed using updated model data based on various reservoir property realizations in accordance with one or more embodiments. More specifically, a simulator device may use updated model data based on one or more geostatistical processes as well as other data types. For example, a simulator device may obtain well design data, such as drilling trajectories, completions specifications, perforations, etc. for use in a reservoir simulation. The data may also include data specific to production wells and/or injection wells. The simulator device may also use dynamic data, such as fluid rates and pressure data, as well as various types of static data, such as fluid types and rock property data.

In Block 730, one or more dynamic responses are determined using one or more reservoir simulations in accordance with one or more embodiments. Various reservoir simulations may be performed based on full physics, finite difference representations of a geological region of interest to predict one or more dynamic responses over multiple time-steps ($t_1 \ldots t_N$). Thus, these different dynamic responses (i.e., scenarios) may correspond to multiple reservoir property realizations.

In Block 740, uncertainty quantification is performed on one or more dynamic responses in accordance with one or more embodiments. Based on various dynamic responses, a reservoir simulation may bracket a search space for a machine-learning algorithm by encapsulating dynamic response data within a domain of various possible solutions, represented by multiple reservoir property realizations with differing likelihoods of occurrence, such as according to various standard deviations. For example, a dynamic response may correspond to a field pressure response of a reservoir region over a full simulation run.

Figure 8A:
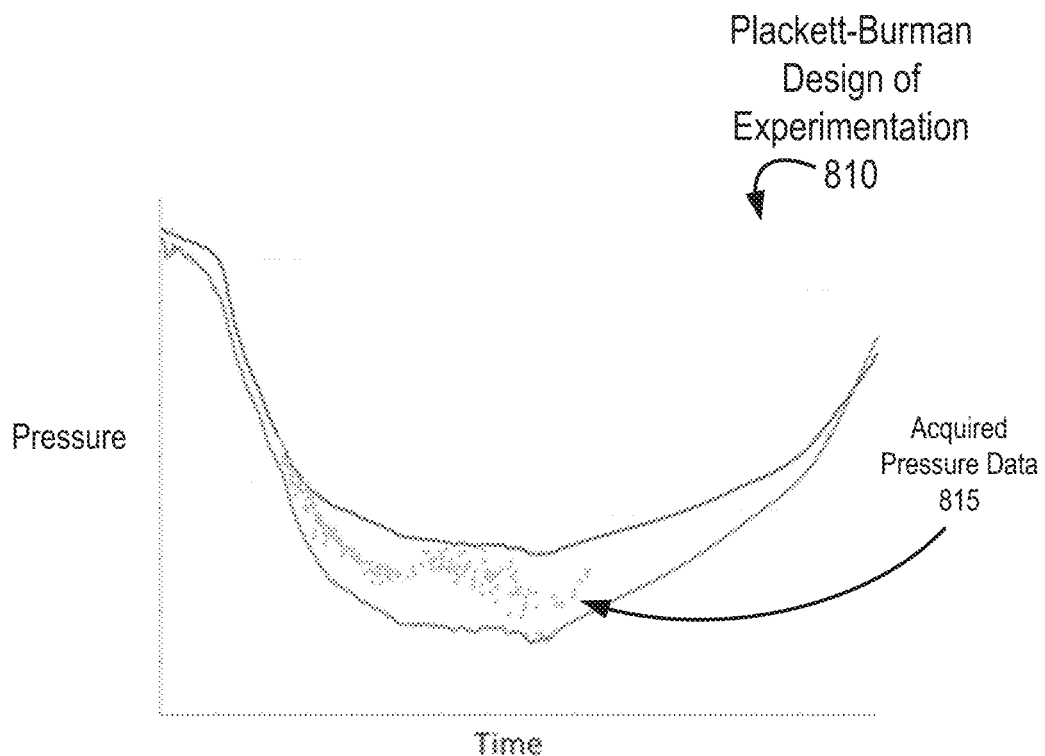
FIGS. 8A, 8B, and 9 show examples in accordance with one or more embodiments.
Figure 8B:
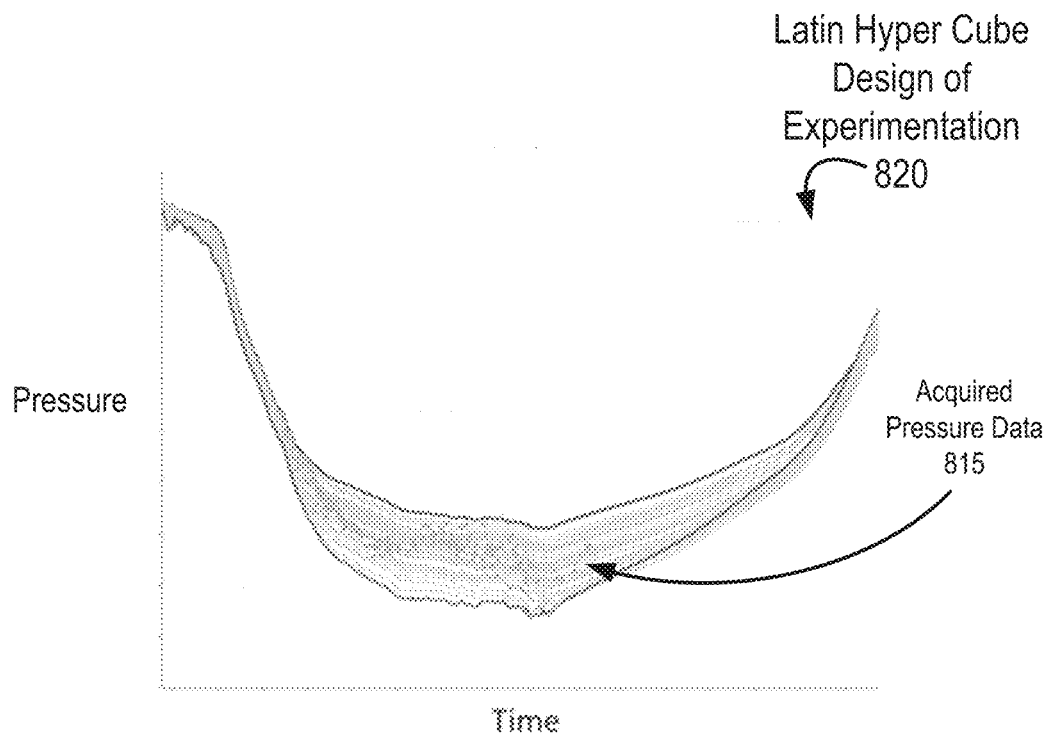

Turning to FIGS. 8A and 8B, FIGS. 8A and 8B provide examples of uncertainty quantification of dynamic responses in accordance with one or more embodiments. In FIG. 8A, a two-level Plackett-Burman design of experiment (DOE) (810) is used to sample an envelope of pressure dynamic response data in an uncertainty and dynamic variability domain. In particular, the Plackett-Burman DOE (810) includes an upper boundary and a lower boundary, where the individual data points between boundaries corresponds to acquired data (i.e., acquired pressure data (815)). In FIG. 8B, a three-level Latin Hyper Cube (LHC) DOE (820) is used to refine sampled variability of the acquired pressure data (815) within the boundaries of an envelope. Thus, an uncertainty quantification may sample the parameters' uncertainty domain such that the corresponding dynamic response brackets the acquired data in a specific uncertainty range. Thus, uncertainty quantifications may be applied to dynamic fluid rate variability, such as with regard to oil saturation, water saturation, and/or gas saturation.

Returning to FIG. 7, in Block 750, dynamic response data is determined based on an uncertainty quantification in accordance with one or more embodiments. Using one or more dynamic responses and/or one or more uncertainty quantifications, a simulator device may generate dynamic response data for generating a reservoir graph network. For example, a particular dynamic response may be transformed into transmissibility values.

Figure 9:
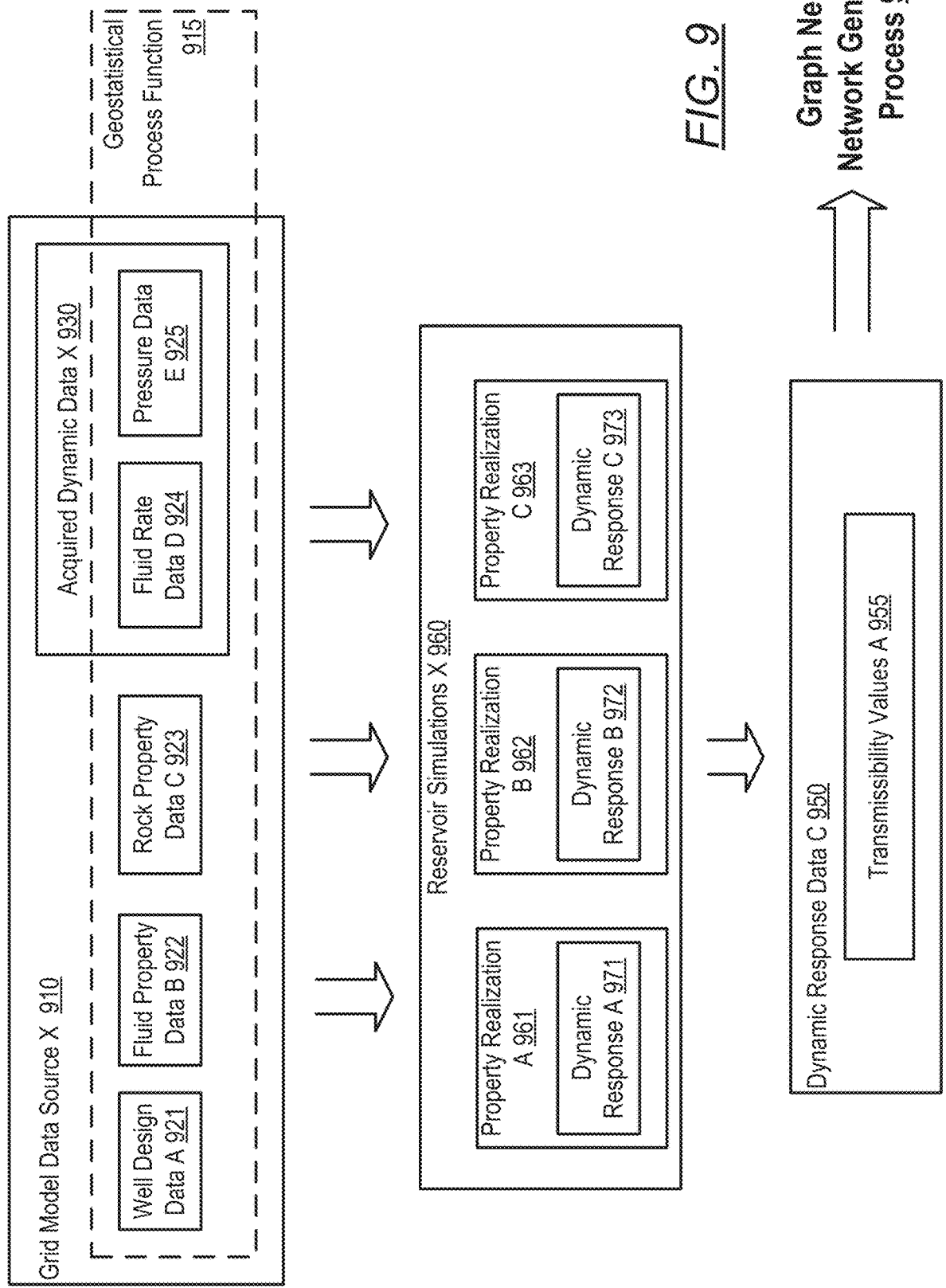

Turning to FIG. 9, FIG. 9 provides an example of generating dynamic response data in accordance with one or more embodiments. The following example is for explanatory purposes only and not intended to limit the scope of the disclosed technology. In FIG. 9, a simulator device (not shown) obtains well design data A (921), fluid property data B (922), rock property data C (923), and acquired dynamic data X (930) from a grid model data source X (910). In particular, the acquired dynamic data X (930) includes fluid rate data D (924) and pressure data E (925). The simulator device uses a geostatistical process function (915) on the data (921, 922, 923, 924, 925) to generate updated model data for reservoir simulations X (960). In particular, the simulator device generates simulations based on different property realizations (i.e., property realization A (961), property realization B (962), property realization C (963)) that includes various dynamic responses (i.e., dynamic response A (971), dynamic response B (972), dynamic response C (973)). As such, the simulator device converts the dynamic responses (971, 972, 973) to dynamic response data C (950) that includes transmissibility values A (955). Thus, the simulator device uses the dynamic response data C (950) in a graph neural network generation process (990).

Figure 10:
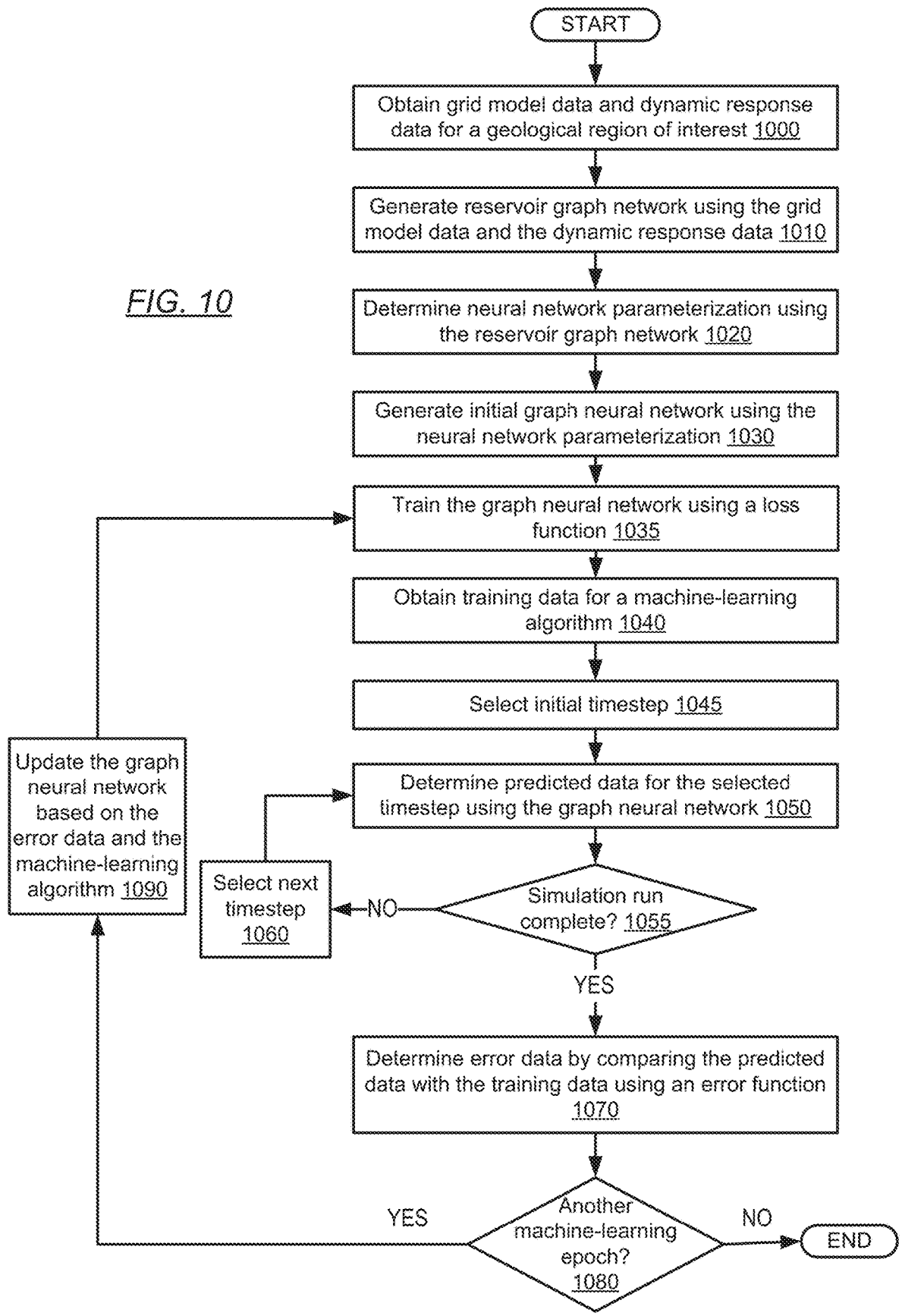
FIG. 10 shows a flowchart in accordance with one or more embodiments.

Turning to FIG. 10, FIG. 10 shows a flowchart in accordance with one or more embodiments. Specifically, FIG. 10 describes a specific method for generating and training a graph neural network. One or more blocks in FIG. 10 may be performed by one or more components (e.g., simulator device (160)) as described in FIGS. 1, 2B, 4, and 5. While the various blocks in FIG. 10 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1000, grid model data and dynamic response data are obtained for a reservoir region of interest in accordance with one or more embodiments. For example, a simulator device may obtain the grid model data from a reservoir grid model similar to the reservoir grid model (290) described above in FIG. 2B and the accompanying description. The reservoir grid model may include a grid that is structured, i.e., a regular grid, or unstructured, i.e., an irregular grid. Likewise, the grid model data may be updated data based on an uncertainty quantification process. The dynamic response data may be obtained in a similar manner as described above in Block 750 in FIG. 7 and the accompanying description.

In Block 1010, a reservoir graph network is generated using grid model data and dynamic response data in accordance with one or more embodiments. More specifically, a reservoir graph network may be generated using directed acyclic graphs. For example, the reservoir graph network may be similar to the reservoir graph network (400) described above in FIG. 4 and the accompanying description. Likewise, the reservoir graph network may include objects for graph nodes, which are connected with graph edges. Here, the graph edges may correspond to relations between objects, such as bi-directional cell transmissibility values.

In Block 1020, a neural network parameterization is determined using a reservoir graph network in accordance with one or more embodiments. In some embodiments, for example, a simulator device performs a network encoding, such as one-hot encoding, that produces a neural network parameterization. For example, this network encoding may convert grid attributes, such as objects and relations, from categorical data into numerical data for analytical processes performed by machine-learning algorithms. Likewise, one-hot encoding may organize a reservoir graph network as a group of bits among where a combination of values are only those with a single high bit (e.g., '1') and all the others bits being low (e.g., '0'). A similar network encoding process may be one-cold encoding where all bits are '1' except one bit that is '0'.

Furthermore, a neural network parameterization may describe objects and relations of a graph neural network. For example, a neural network parameterization may specify a number of senders of relation information, and the number of receivers of relation information. Likewise, the neural network parameterization may include a relation information array that identifies relation information between objects using different types of relations (e.g., diffuse relation, produce relation, inject relation) and an effect vector, which embeds node-to-node interactions.

For network encoding of a reservoir graph network, a network encoding may be applied to grid cells with the following reservoir grid attributes: grid cells, oil volume (OV) water volume (WV), pressure (P), pore-volume (PORV) and well connate water (CW). For grid cell encoding, the encoded effect may be conditioned with respect to the transmissibility of each source cell among the grid cells for the relation information. For encoding production wells, well oil production rate (WOPR) and well water production rate (WWPR) may be encoded to effect relation information. For injection wells, well water injection rate (WWIR) may be the encoded effect for the relation information.

In Block 1030, an initial graph neural network is generated using a neural network parameterization in accordance with one or more embodiments. In particular, a relation model may be defined as the inputs for a graph neural network, where the relation model is a vector with components for sender relation data, receiver relation data, and relation information. Thus, a graph neural network may be produced as such a relation model. Likewise, an effect vector of a graph neural network may be tailored to predict various values as the output of the graph neural network. As such, an effect vector may also be used to define an object array with respect to the graph neural network. In some embodiments, the outputs of the graph neural network include oil volume, water volume, and pressure data.

Figure 11:
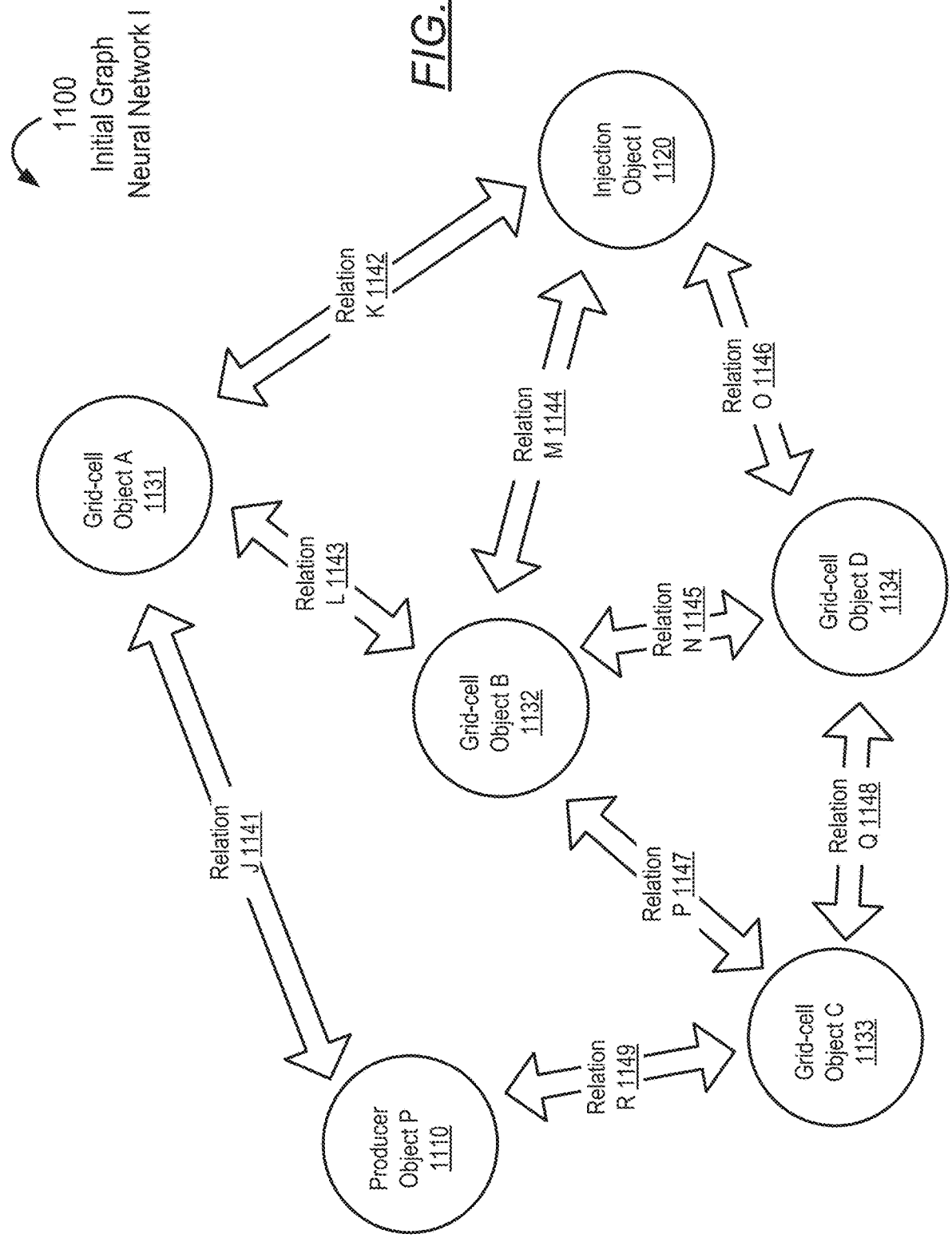
FIGS. 11, 12A, 12B, and 13 show examples in accordance with one or more embodiments.

Turning to FIG. 11, FIG. 11 provides an example of an initial graph neural network in accordance with one or more embodiments. The following example is for explanatory purposes only and not intended to limit the scope of the disclosed technology. In FIG. 11, an initial graph neural network I (1100) includes various graph objects (i.e., grid-cell object A (1131), grid-cell object B (1132), grid-cell object C (1133), grid-cell object D (1134), injector object I (1120), producer object P (1110)) and various graph relations (i.e., relation J (1141), relation K (1142), relation L (1143), relation M (1144), relation N (1145), relation O (1146), relation P (1147), relation Q (1148), relation R (1149)). In particular, a simulator device (not shown) transformed various grids cells from a reservoir graph network into the grid-cell objects (1131, 1132, 1133, 1134), while also converting a production well into producer object P (1110) and an injection well into injector object I (1120). Thus, the set of objects and relations define a neural network parameterization for the initial graph neural network I (1100).

Returning to FIG. 10, in Block 1035, a graph neural network is trained using a loss function in accordance with one or more embodiments. For example, the loss function may be a mean square error (MSE) function that determines the difference between the training data and the predicted data for a reservoir simulation. As such, Block 1035 may correspond to an optimization process (via minimization of loss function) that is iteratively performed until the MSE is minimized over a number of iterations (i.e. increasing number of epochs). In another example, an input vector of a graph neural network may be defined using the following equation:

$$x_j = \sigma\left[\sum_{i=1}^{I}(\omega_{ij}x_i + b_j)\right] \quad \text{Equation 1}$$

where x corresponds to an input vector for a particular input feature (e.g., object feature or relation feature) of an input layer (i.e., the initial hidden layer of the graph neural network), σ is the loss associated with input data, ω is the vector of weight coefficients and b is a scaling factor. The objective of analyzing predicted data may be to find the optimal values of the pair $\theta\{\omega^i,b^i\}_{i=1}^{L+1}$ that satisfy a predetermined criterion, i.e., achieve a predetermined level of prediction accuracy for the model. In this pair, 'L' refers to the numbers of hidden layers in a deep neural network. In some embodiments, for example, a loss function may be expressed using the following equation:

$$L(\theta) = MSE_{data} = \frac{1}{N}\sum_{i=1}^{N}(f_{w,b}(x_i) - y_i)^2 \quad \text{Equation 2}$$

where $MSE_{data}$ corresponds to loss data, y corresponds to a target vector of an output layer of the graph neural network, $x_i$ is the input vector for the graph neural network, and $f_{w,b}(x_i)$ is the predicted data from the graph neural network. For example, a target vector may be represented as acquired oil volume data and/or acquired water volume data from a training dataset.

In Block 1040, training data is obtained for a machine-learning algorithm in accordance with one or more embodiments. For example, acquired dynamic data, synthetic dynamic data, and/or augmented dynamic data may form a training dataset for a graph neural network. Likewise, the training dataset may be divided into multiple batches for multiple machine-learning epochs. Thus, a graph neural network may be trained iteratively using epochs until the graph neural network achieves a predetermined level of accuracy in predicting data for a desired application. One iteration of the training phase may correspond to Blocks 1050-1090 below in FIG. 10 and the accompanying description. Thus, better training of the graph neural network may lead to better predictions using the model. Once the training data is passed through all of the epochs and the model is further updated based on the model's predictions in each epoch, a trained model may be the final result of a machine-learning algorithm, e.g., in Block 1080 below. In some embodiments, multiple trained graph neural networks are compared and the best trained model is selected accordingly.

In Block 1045, an initial timestep is selected in accordance with one or more embodiments. In particular, a simulator device uses a graph neural network to predict simulation data over multiple timesteps during a reservoir simulation. Thus, an initial timestep may be selected in Block 1045, which may be incremented at a predetermined interval in Block 1060 below until the reservoir simulation is complete.

In Block 1050, predicted data is determined for a selected timestep using a graph neural network in accordance with one or more embodiments. For example, at a selected timestep, a graph neural network may predict oil volume data, water volume data, and/or pressure data for the current reservoir simulation. Thus, the predicted data may form a portion of a time-series set of data for analyzing the accuracy of the graph neural network within the current epoch.

In Block 1055, a determination is made whether a simulation run is complete in accordance with one or more embodiments. When a determination is made that a reservoir simulation is complete, the process may proceed to Block 1070. When a determination is made that one or more timesteps are needed for the reservoir simulation, the process may return to Block 1060.

In Block 1060, a next timestep is selected in accordance with one or more embodiments. As such, a reservoir simulation may increment the current time in a reservoir simulation by a predetermined interval until the reservoir simulation finishes. Subsequently, a simulator device may obtain predicted data for this timestep.

In Block 1070, error data is determined by comparing predicted data with training data using an error function in accordance with one or more embodiments. In some embodiments, the error function is a misfit function, such as a multi-objective misfit function. In particular, a multi-objective misfit function may be expressed using the following equation:

$$\text{Misfit\_OF} = \frac{\omega_i}{N_i} \sum_j^{N_i} \omega_j \frac{(sim_i^j - obs_i^j)^2}{\sigma_i^2} \qquad \text{Equation 3}$$

where $sim_i$ corresponds to predicted dynamic data (e.g., predicted pressure data), $obs_i$ corresponds to acquired dynamic data (e.g., acquired dynamic data X (930)), the $\omega$ corresponds to a weight assigned to an individual misfit term, $\sigma$ corresponds to the standard deviation of the individual misfit term, i corresponds to a number of wells in the correspond reservoir graph network or reservoir grid model, and j corresponds to a number of timesteps where predicted data is determined for each timestep in a reservoir simulation. Moreover, a misfit minimization problem may be defined in Gaussian domain.

In Block 1080, a determination is made whether another machine-learning epoch is used to further train a graph neural network in accordance with one or more embodiments. For example, a predetermined criterion may be used for specifying the number of machine-learning epochs for the training. For example, a specific number of machine-learning epochs may be assigned to a training phase for a graph neural network. In some embodiments, error data measured between predicted data and acquired data, e.g., using an error function, is used to determine whether a global minimum is achieved by the current version of the graph neural network. Once a global minimum or convergence has been determined, a simulator device may terminate the machine learning process. When a determination is made that a training phase includes no more machine-learning epochs, the process may end. When a determination is made that one or more machine-learning epochs are required for further training, the process may return to Block 1090.

Furthermore, various field development strategies may be used to train a graph neural network, such as identifying drilling sweet spots, well placement optimization, optimization of well constraints, well workover design and optimization of pressure maintenance, and/or injection strategies. Thus, a trained model may determine a maximized field recovery that satisfies target rates and maximizes a production plateau length.

In Block 1090, a graph neural network is updated based on error data and a machine-learning algorithm in accordance with one or more embodiments. In some embodiments, the machine-learning algorithm is a deep reinforcement learning (DRL) algorithm. For example, a DRL algorithm may be a model-based DRL algorithm, a value-based DRL algorithm, or a policy-based DRL algorithm. For more information on DRL algorithms, see FIG. 13 and the accompanying description below.

Figure 12A:
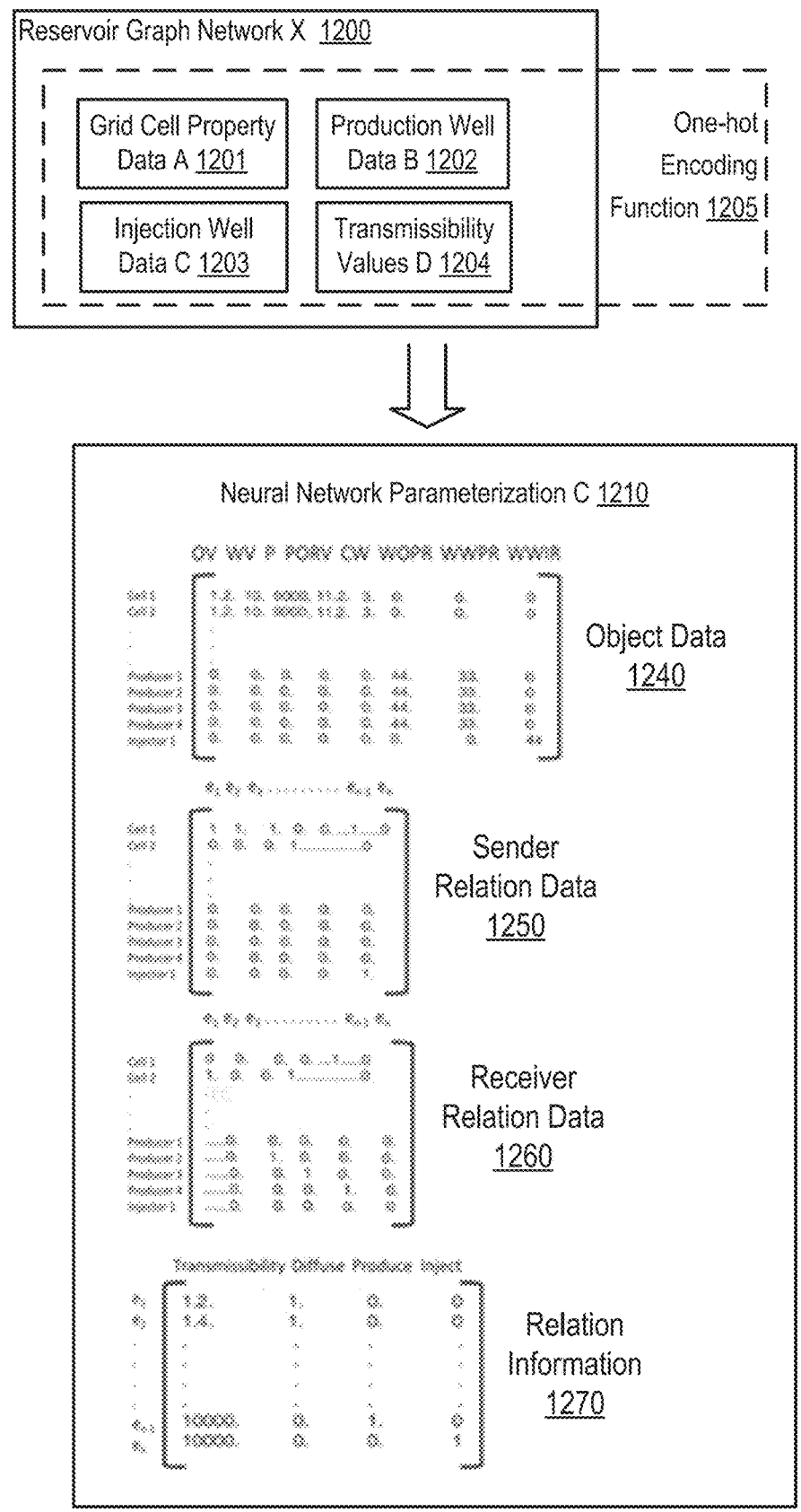
Figure 12B:
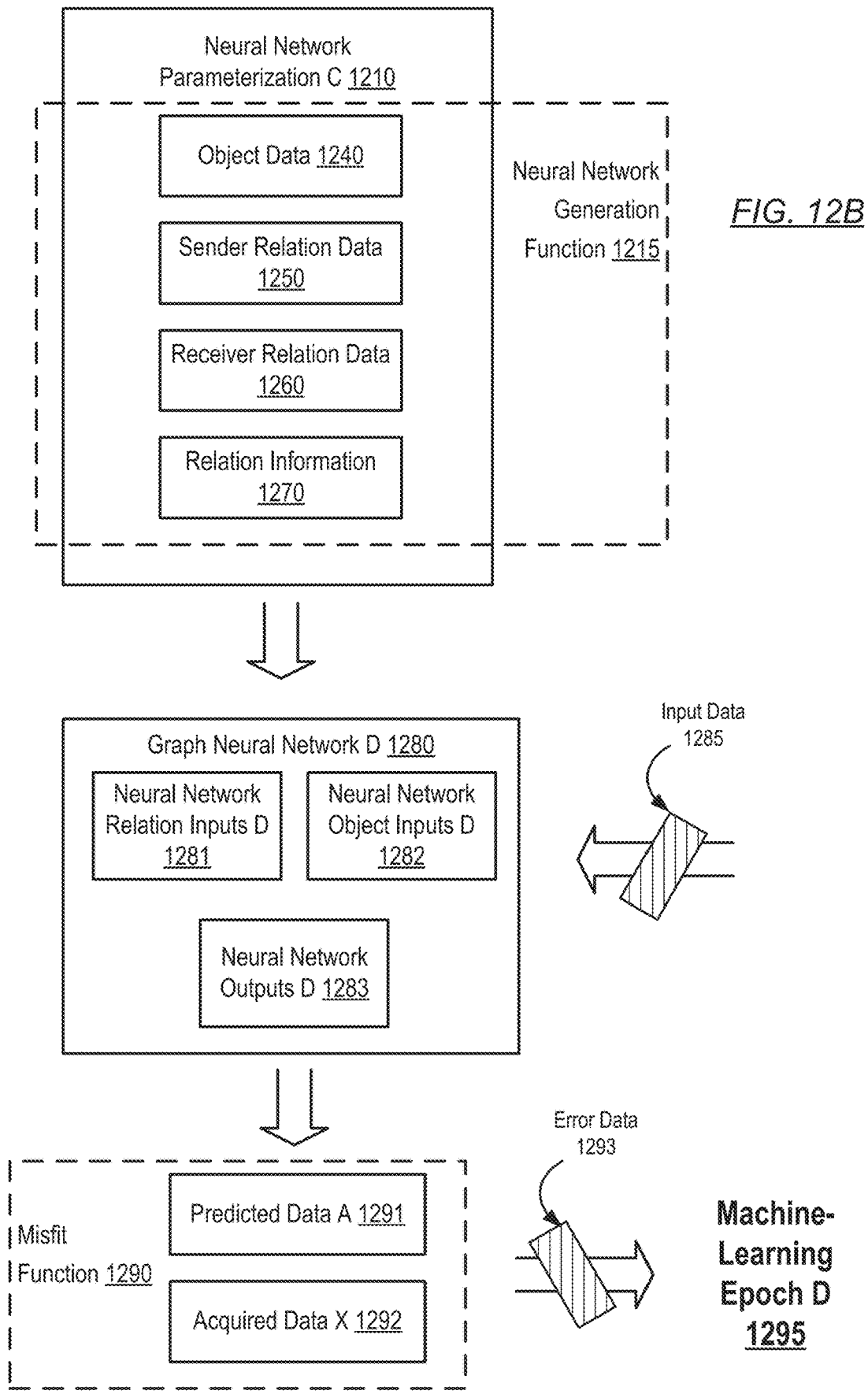

Turning to FIGS. 12A and 12B, FIGS. 12A and 12B provide an example of generating a graph neural network using a reservoir graph network in accordance with one or more embodiments. The following example is for explanatory purposes only and not intended to limit the scope of the disclosed technology.

In FIG. 12A, a simulator device (not shown) obtains a reservoir graph network X (1200) based on a particular reservoir grid model. In particular, the reservoir graph network X (1200) includes grid cell property data A (1201), production well data B (1202), injection well data C (1203), and transmissibility values D (1204), which are input into a one-hot encoding function (1205) to generate a neural network parameterization C (1210). As shown in FIG. 12A, the neural network parameterization C (1210) includes object data (1240) that defines various grid-cell objects, various producer objects, and an injector object, where the objects have corresponding attribute values for oil volume (OV), water volume (WV), pressure (P), pore volume (PORV), connate water saturation (CW), relative permeability (RELPERM), oil-well oil production rate (WOPR), well water production rate (WWPR), and well water injection rate (WWIR). The neural network parameterization C (1210) also includes sender relation data (1250) and receiver relation data (1260), which are binarized matrices for input to a machine-learning algorithm. The neural network parameterization C (1210) further includes relation information (1270) that describes an effect vector (i.e., $e_i$) defining transmissibility values, diffuse values, producer values, and injection values.

Turning to FIG. 12B, a neural network generation function (1215) is applied to the object data (1240), the sender relation data (1250), the receiver relation data (1260), and the relation information (1270) to produce a graph neural network D (1280) with neural network relation inputs D (1281), neural network object inputs D (1282), and neural network outputs D (1283). Accordingly, the graph neural network D (1280) obtains input data (1285) that is used to determine predicted data A (1291). Subsequently, a misfit function (1290) compares the predicted data A (1291) with acquired data X (1292) to produce error data (1293). Where the error data (1293) fails to satisfy a predetermined criterion, the error data (1293) is used to update the neural network parameterization C (1210) in the next machine-learning epoch, i.e., machine-learning epoch D (1295).

Figure 13:
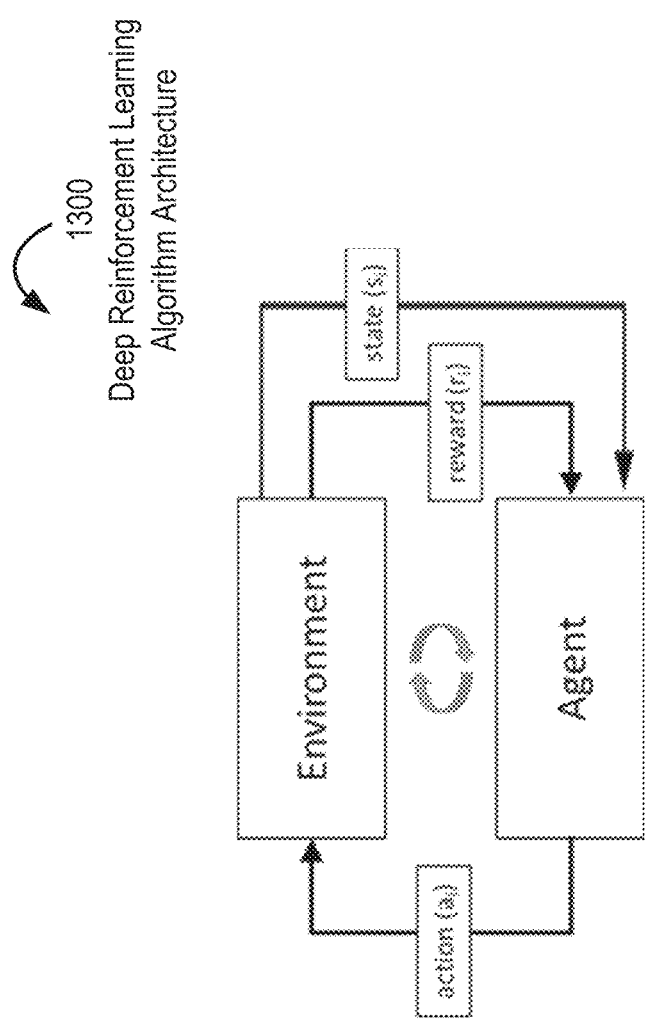

Turning to FIG. 13, FIG. 13 illustrates a deep reinforcement learning (DRL) algorithm architecture in accordance with one or more embodiments. As shown in FIG. 13, a DRL algorithm architecture (1300) may include an agent that performs an optimization action, e.g. solves an optimization problem based on an error function, such as misfit function. Thus, action (a) may define a set of possible moves that an agent can make, e.g. with respect to object and relation updates within a machine-learning epoch. The DRL algorithm architecture (1300) may further include a state (s) that defines a concrete and immediate situation in which a particular agent finds itself (i.e., a prior version of a graph neural network may be the initial state, and the updated graph neural network may be a final state). The DRL algorithm architecture (1300) may further includes a reward (r) that defines the feedback by which the success or failure of an agent's actions is measured. The DRL algorithm architecture (1300) may further include a policy ($7r$) that defines a predetermined strategy that the agent employs to determine the next action based on the current state (e.g., maps states to actions that promise the highest reward). The DRL algorithm architecture (1300) may further include a value (V) that defines the expected long-term return under policy $7r$, as subject to maximization of an objective function; e.g. net present value (NPV) of a production well, oil recovery, etc.

Keeping with FIG. 13, an agent may perform an action that changes its state in an environment that provides the reward. For example, the propagation from state i to i+1 may be defined with a transition function T. In general, an Agent-Environment interaction in the DRL algorithm architecture (1300) may resemble a Markovian stochastic control process. In some embodiments, for example, an optimization problem solved by a DRL algorithm may be a dynamic model calibration criterion and/or a history matching criterion. In this case, the process of propagating from state i to i+1, using the transition function T may be defined as a Markov chain. In some embodiments, the state vector of a DRL algorithm architecture (1300) corresponds to a reservoir graph network, or error data output from an error function (e.g., data output from a multi-objective misfit function). As such, the transition function T may define a state ($s_i$) and reward $r_i$, sampled by a sampling function, such as a Random Walk Sampler. In some embodiments, the agent may be defined by a Metropolis Hastings sampler criterion and performs action $a_i$.

In some embodiments, where a stationary distribution of state vector is defined as f(m*), the Markov chain deployed in a DRL algorithm architecture may include a proposal of an initial state, $m^i$. Next, the DRL algorithm may include a proposal for a transition state, m*, from a conditional probability density function (pdf), q(m*|$m^i$) for proposing candidates. As such, a Random Walk Sampler, representing the transition function T, may generate a proposal according to $m^{i+1}=m^i+\sigma\varepsilon$, where $\sigma$ is a positive small number, referred to as step-size (of the Markov chain) and $\varepsilon$ is a random variable, sampled from a certain distribution, typically Gaussian, with zero mean and unit variance (e.g., prior distribution). The DLR algorithm may further generate a random number u from a uniform distribution, U(0,1), and subsequently determine transition acceptance. Where u≤α(m*,$m^i$), the DRL algorithm may promote to a proposed state, such that $m^{i+1}$=m*. Otherwise, the DRL algorithm may reject m* and $m^{i+1}$=m*. The DRL algorithm may propose a new transition state and repeat the procedure accordingly. Thus, the acceptance criteria in the DRL algorithm may be the Metropolis-Hasting criterion, which may be expressed using the following equation:

$$\alpha(m^*, m^i) = \min\left[1, \frac{q(m^i \mid m^*)f(m^*)}{q(m^* \mid m^i)f(m^i)}\right] \quad \text{Equation 4}$$

Figure 14:
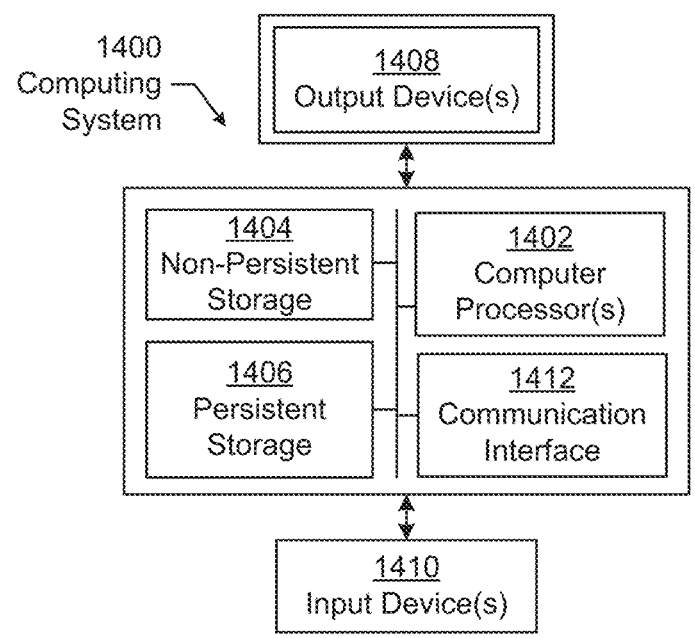
FIG. 14 shows a computing system in accordance with one or more embodiments.

Embodiments may be implemented on a computing system. Any combination of mobile, desktop, server, router, switch, embedded device, or other types of hardware may be used. For example, as shown in FIG. 14, the computing system (1400) may include one or more computer processors (1402), non-persistent storage (1404) (e.g., volatile memory, such as random access memory (RAM), cache memory), persistent storage (1406) (e.g., a hard disk, an optical drive such as a compact disk (CD) drive or digital versatile disk (DVD) drive, a flash memory, etc.), a communication interface (1412) (e.g., Bluetooth interface, infrared interface, network interface, optical interface, etc.), and numerous other elements and functionalities.

The computer processor(s) (1402) may be an integrated circuit for processing instructions. For example, the computer processor(s) may be one or more cores or micro-cores of a processor. The computing system (1400) may also include one or more input devices (1410), such as a touchscreen, keyboard, mouse, microphone, touchpad, electronic pen, or any other type of input device.

The communication interface (1412) may include an integrated circuit for connecting the computing system (1400) to a network (not shown) (e.g., a local area network (LAN), a wide area network (WAN) such as the Internet, mobile network, or any other type of network) and/or to another device, such as another computing device.

Further, the computing system (1400) may include one or more output devices (1408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1402), non-persistent storage (1404), and persistent storage (1406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system or group of computing systems described in FIG. 14 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (1400) in FIG. 14. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 14, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 14 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 14 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 14. Other functions may be performed using one or more embodiments of the disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   obtaining, by a computer processor, dynamic response data regarding a geological region of interest, wherein the dynamic response data comprises a plurality of transmissibility values;
   determining, by the computer processor, a reservoir graph network based on the dynamic response data and a reservoir grid model, wherein the reservoir graph network comprises a plurality of grid cells, a plurality of wells, and a plurality of graph edges;
   determining, by the computer processor, a neural network parameterization using one-hot encoding and the reservoir graph network,
   wherein the neural network parameterization comprises object data, sender relation data, receiver relation data, and relation information;
   generating, by the computer processor, a first graph neural network based on the reservoir graph network, wherein the first graph neural network is generated by a simulator device using the neural network parameterization;
updating, by the computer processor, the first graph neural network using a machine-learning algorithm to produce an updated graph neural network for the geological region of interest; and
simulating, by the computer processor, one or more wells within the geological region of interest using the updated graph neural network.

2. The method of claim 1,
wherein the updated graph neural network comprises a plurality of hidden layers, a plurality of objects, and a plurality of relations,
wherein the plurality of objects correspond to the plurality of grid cells and the plurality of wells, and
wherein the plurality of relations correspond to the plurality of transmissibility values.

3. The method of claim 2,
where the updated graph neural network obtains oil saturation values, water saturation values, pressure values, pore volume values, connate water saturation values, and oil-water relative permeability values as inputs, and
wherein the updated graph neural network outputs a predicted oil volume, a predicted water volume, and a predicted pressure value in response to the inputs.

4. The method of claim 1, further comprising:
obtaining predicted data for the geological region of interest using the first graph neural network;
comparing the predicted data to acquired data for the geological region of interest to produce a comparison; and
determining error data using the comparison and an error function,
wherein the first graph neural network is updated based on the error data.

5. The method of claim 4,
where the error function is a misfit function, and
wherein the predicted data is simulated data that is obtained for a plurality of timesteps,
wherein the acquired data is obtained from sensors coupled to one or more wells, and
wherein the machine-learning algorithm is a deep reinforcement learning algorithm.

6. The method of claim 1, further comprising:
performing a plurality of reservoir simulations regarding the geological region of interest to determine a plurality of streamlines,
wherein a streamline among the plurality of streamlines is from an injection well to a production well within the geological region of interest, and
wherein the dynamic response data comprises a transmissibility value of the streamline at a predetermined grid cell within a reservoir grid model for the geological region of interest.

7. A method, comprising:
obtaining, by a computer processor, dynamic response data regarding a geological region of interest, wherein the dynamic response data comprises a plurality of transmissibility values;
determining, by the computer processor, a reservoir graph network based on the dynamic response data and a reservoir grid model, wherein the reservoir graph network comprises a plurality of grid cells, a plurality of wells, and a plurality of graph edges;
generating, by the computer processor, a first graph neural network based on the reservoir graph network;
obtaining, by the computer processor, training data for a machine-learning algorithm;
determining by the computer processor, whether a first difference between predicted data and a first portion of the training data satisfies a predetermined criterion, wherein the predicted data is generated by the first graph neural network during a machine-learning epoch;
and updating, by the computer processor, in response to the first difference failing to satisfy the predetermined criterion, the first graph neural network to produce an updated graph neural network for the geological region of interest, wherein the updated graph neural network is updated iteratively using a plurality of machine-learning epochs and the training data to produce the updated graph neural network;
and simulating, by the computer processor, one or more wells within the geological region of interest using the updated graph neural network.

8. A method, comprising: obtaining, by a computer processor, grid model data from a reservoir grid model for a geological region of interest;
Determining, by the computer processor, updated model data based on the grid model data and a geostatistical process;
Performing, by the computer processor, a plurality of reservoir simulations using the updated model data to generate a plurality of reservoir property realizations for the geological region of interest; and
Performing, by the computer processor, an uncertainty quantification for a plurality of dynamic responses from the plurality of reservoir simulations;
obtaining, by the computer processor, dynamic response data regarding a geological region of interest, wherein the dynamic response data comprises a plurality of transmissibility values; determining, by the computer processor, a reservoir graph network based on the dynamic response data and a reservoir grid model, wherein the reservoir graph network comprises a plurality of grid cells, a plurality of wells, and a plurality of graph edges; generating, by the computer processor, a first graph neural network based on the reservoir graph network; Updating, by the computer processor, the first graph neural network using a machine-learning algorithm to produce an updated graph neural network for the geological region of interest; and simulating, by the computer processor, one or more wells within the geological region of interest using the updated graph neural network.

9. A system, comprising:
a logging system coupled to a plurality of logging tools; and a simulator device comprising a computer processor, wherein the simulator device is coupled to the logging system,
the simulator device configure to:
obtain dynamic response data regarding a geological region of interest, wherein the dynamic response data comprises a plurality of transmissibility values;
determine a reservoir graph network based on the dynamic response data and a reservoir grid model, wherein the reservoir graph network comprises a plurality of grid cells, a plurality of wells, and a plurality of graph edges;
determine a neural network parameterization using one-hot encoding and the reservoir graph network, wherein the neural network parameterization comprises object data, sender relation data, receiver relation data, and relation information;

generate a first graph neural network based on the reservoir graph network, wherein the first graph neural network is generated by the simulator device using the neural network parameterization;
update the first graph neural network using a machine-learning algorithm to produce an updated graph neural network for the geological region of interest; and
simulate one or more wells within the geological region of interest using the updated graph neural network.

10. The system of claim 9, wherein the simulator device further comprises functionality for:
obtaining predicted data for the geological region of interest using the first graph neural network;
comparing the predicted data to acquired data for the geological region of interest to produce a comparison; and
determining error data using the comparison and an error function,
wherein the first graph neural network is updated based on the error data.

11. The system of claim 9,
wherein the updated graph neural network comprises a plurality of hidden layers, a plurality of objects, and a plurality of relations,
wherein the plurality of objects correspond to the plurality of grid cells and the plurality of wells, and
wherein the plurality of relations correspond to the plurality of transmissibility values.

12. The system of claim 9, wherein the simulator device further comprises functionality for:
performing a plurality of reservoir simulations regarding the geological region of interest to determine a plurality of streamlines,
wherein a streamline among the plurality of streamlines is from an injection well to a production well within the geological region of interest, and
wherein the dynamic response data comprises a transmissibility value of the streamline at a predetermined grid cell within a reservoir grid model for the geological region of interest.

13. A system, comprising:
a logging system coupled to a plurality of logging tools; and
a simulator device comprising a computer processor, wherein the simulator device is coupled to the logging system, the simulator device configure to:
obtain dynamic response data regarding a geological region of interest, wherein the dynamic response data comprises a plurality of transmissibility values;
determine a reservoir graph network based on the dynamic response data and a reservoir grid model, wherein the reservoir graph network comprises a plurality of grid cells, a plurality of wells, and a plurality of graph edges;
generate a first graph neural network based on the reservoir graph network;
obtain training data for a machine-learning algorithm;
determining whether a first difference between predicted data and a first portion of the training data satisfies a predetermined criterion, wherein the predicted data is generated by the first graph neural network during a machine-learning epoch; and
update, in response to the first difference failing to satisfy the predetermined criterion, the first graph neural network to produce an updated graph neural network for the geological region of interest, and wherein the updated graph neural network is updated iteratively using a plurality of machine-learning epochs and the training data to produce the updated graph neural network; and simulating one or more wells within the geological region of interest using the updated graph neural network.

14. A system, comprising:
a logging system coupled to a plurality of logging tools; and a simulator device comprising a computer processor, wherein the simulator device is coupled to the logging system, the simulator device configure to:
obtain grid model data from a reservoir grid model for a geological region of interest;
determine updated model data based on the grid model data and a geostatistical process;
perform a plurality of reservoir simulations using the updated model data to generate a plurality of reservoir property realizations for the geological region of interest;
perform an uncertainty quantification for a plurality of dynamic responses from the plurality of reservoir simulations;
obtain dynamic response data regarding a geological region of interest, wherein the dynamic response data comprises a plurality of transmissibility values;
determine a reservoir graph network based on the dynamic response data and a reservoir grid model, wherein the reservoir graph network comprises a plurality of grid cells, a plurality of wells, and a plurality of graph edges;
generate a first graph neural network based on the reservoir graph network; updating the first graph neural network using a machine-learning algorithm to produce an updated graph neural network for the geological region of interest; and
simulate one or more wells within the geological region of interest using the updated graph neural network.

15. A non-transitory computer readable medium storing instructions executable by a computer processor, the instructions comprising functionality for:
obtaining dynamic response data regarding a geological region of interest, wherein the dynamic response data comprises a plurality of transmissibility values;
determining a reservoir graph network based on the dynamic response data and a reservoir grid model, wherein the reservoir graph network comprises a plurality of grid cells, a plurality of wells, and a plurality of graph edges;
determining, by the computer processor, a neural network parameterization using one-hot encoding and the reservoir graph network,
wherein the neural network parameterization comprises object data, sender relation data, receiver relation data, and relation information;
generating a first graph neural network based on the reservoir graph network, wherein the first graph neural network is generated using the neural network parameterization;
updating the first graph neural network using a machine-learning algorithm to produce an updated graph neural network for the geological region of interest; and
simulating one or more wells within the geological region of interest using the updated graph neural network.

16. The non-transitory computer readable medium of claim 15, wherein the instructions further comprise functionality for:
obtaining predicted data for the geological region of interest using the first graph neural network;

comparing the predicted data to acquired data for the geological region of interest to produce a comparison; and determining error data using the comparison and an error function, wherein the first graph neural network is updated based on the error data.

17. The non-transitory computer readable medium of claim 16, where the error function is a misfit function, and wherein the predicted data is simulated data that is obtained for a plurality of timesteps, wherein the acquired data is obtained from sensors coupled to one or more wells, and wherein the machine-learning algorithm is a deep reinforcement learning algorithm.

\* \* \* \* \*